(12) United States Patent
Jiang

(10) Patent No.: US 10,837,619 B2
(45) Date of Patent: Nov. 17, 2020

(54) OPTICAL SYSTEM FOR MULTI-EMITTER LED-BASED LIGHTING DEVICES

(71) Applicant: LedEngin, Inc., San Jose, CA (US)

(72) Inventor: Wu Jiang, Sunnyvale, CA (US)

(73) Assignee: LedEngin, Inc., San Jose, CA (US)

( * ) Notice: Subject to any disclaimer, the term of this patent is extended or adjusted under 35 U.S.C. 154(b) by 0 days.

(21) Appl. No.: 15/974,567

(22) Filed: May 8, 2018

(65) Prior Publication Data

US 2019/0293261 A1  Sep. 26, 2019

Related U.S. Application Data

(60) Provisional application No. 62/645,684, filed on Mar. 20, 2018.

(51) Int. Cl.
*F21V 5/00* (2018.01)
*F21Y 113/13* (2016.01)
*F21Y 115/10* (2016.01)

(52) U.S. Cl.
CPC .......... *F21V 5/007* (2013.01); *F21Y 2113/13* (2016.08); *F21Y 2115/10* (2016.08)

(58) Field of Classification Search
CPC ... F21V 5/007; F21Y 2115/10; F21Y 2113/13
See application file for complete search history.

(56) References Cited

U.S. PATENT DOCUMENTS

| 4,447,126 A | 5/1984 | Heidrich et al. |
| 7,887,197 B2 | 2/2011 | Iwanaga |
| 9,222,643 B2 | 12/2015 | Zhang et al. |
| 9,360,675 B2 | 6/2016 | Minano et al. |
| 9,411,083 B2 | 8/2016 | Angelini et al. |
| 9,657,930 B2 | 5/2017 | Nolan et al. |
| 9,772,498 B2 | 9/2017 | Kowasic |
| 2010/0039830 A1 | 2/2010 | Cheung et al. |
| 2011/0063836 A1 | 3/2011 | Salm |
| 2012/0026748 A1* | 2/2012 | Boonekamp ......... G02B 6/0008 362/551 |

(Continued)

FOREIGN PATENT DOCUMENTS

| AU | 749304 | 6/2002 |
| CN | 201130257 | 10/2008 |

(Continued)

*Primary Examiner* — Donald L Raleigh

(74) *Attorney, Agent, or Firm* — Kilpatrick Townsend & Stockton LLP

(57) ABSTRACT

An optical system for a multi-color, multi-emitter LED-based lighting device can include a lens array. The lens array can include a number of color-mixing rod members extending parallel to each other along an optical axis, the color-mixing rod members being arranged and spaced so that the rear end of each color-mixing rod member aligns with a different one of the emitters. A beam-forming section can be formed at the front ends of the color mixing rod members. The beam-forming section can include nonplanar (e.g., convex or concave) front surface features, each nonplanar front surface feature being aligned with a front end of a corresponding one of the color-mixing rod members. The beam-forming section and color-mixing rod members can be formed as a unitary structure.

20 Claims, 30 Drawing Sheets

(56) References Cited

U.S. PATENT DOCUMENTS

| | | | |
|---|---|---|---|
| 2013/0058122 A1* | 3/2013 | Hsiung | G03B 21/2033 |
| | | | 362/551 |
| 2013/0194798 A1 | 8/2013 | Yang | |
| 2015/0109773 A1 | 4/2015 | Li et al. | |
| 2016/0018064 A1* | 1/2016 | Jurik | F21S 8/00 |
| | | | 362/231 |
| 2016/0040854 A1 | 2/2016 | Zhang | |
| 2016/0208999 A1* | 7/2016 | Jurik | F21S 10/007 |
| 2016/0290597 A1* | 10/2016 | Jurik | F21V 11/186 |
| 2016/0298813 A1* | 10/2016 | Jurik | F21V 11/186 |
| 2016/0320048 A1* | 11/2016 | Daniels | F21V 31/00 |
| 2017/0030537 A1* | 2/2017 | Powell | F21S 2/00 |
| 2018/0129027 A1* | 5/2018 | Jurik | F21S 10/007 |

FOREIGN PATENT DOCUMENTS

| | | |
|---|---|---|
| CN | 201496880 | 6/2010 |
| CN | 201568777 | 9/2010 |
| CN | 201568808 | 9/2010 |
| CN | 201593756 | 9/2010 |
| CN | 101457900 | 6/2011 |
| CN | 201851899 | 6/2011 |
| CN | 101907230 | 6/2012 |
| CN | 102518964 | 6/2012 |
| CN | 202392617 | 8/2012 |
| CN | 202904102 | 4/2013 |
| CN | 102155713 | 6/2013 |
| CN | 203202671 | 9/2013 |
| CN | 203258423 | 10/2013 |
| CN | 203464053 | 3/2014 |
| CN | 204254511 | 4/2015 |
| CN | 204300745 | 4/2015 |
| CN | 102662301 | 5/2015 |
| CN | 204422793 | 6/2015 |
| CN | 103185286 | 9/2015 |
| CN | 105299563 | 2/2016 |
| CN | 103968270 | 3/2016 |
| CN | 103900020 | 6/2016 |
| CN | 205301793 | 6/2016 |
| CN | 103968268 | 9/2016 |
| CN | 205640635 | 10/2016 |
| EP | 0926513 | 6/1999 |
| EP | 2436970 | 4/2012 |
| GB | 2214324 | 8/1989 |
| GB | 2391702 | 4/2006 |
| WO | 2010093956 | 8/2010 |
| WO | 2013010712 | 1/2013 |
| WO | 2013010718 | 1/2013 |

* cited by examiner

OPTICAL SYSTEM FOR MULTI-EMITTER LED-BASED LIGHTING DEVICES

CROSS-REFERENCE TO RELATED APPLICATION

This application claims the benefit of U.S. Provisional Application No. 62/645,684, filed Mar. 20, 2018, the disclosure of which is incorporated herein by reference.

BACKGROUND

This disclosure relates generally to optical systems for lighting devices that incorporate light-emitting diodes (LEDs) and in particular to optical systems for multi-emitter LED-based lighting devices and lighting devices incorporating such optical systems.

Etendue quantifies the size and angular spread of a beam of light. In the case of a light source, etendue is calculated by multiplying the area of the light source and the solid angle of the emitted light beam. Etendue is subject to the following conservation principle: given a particular light source, etendue cannot be decreased without incurring light loss.

In some contexts, such as stage lighting, low etendue is particularly desirable because lighting devices with low etendue provide more control over the lighting of particular portions of the stage. Low etendue, combined with the ability to control the color and brightness of individual lighting devices, allows production designers to achieve desired effects, such as spotlighting particular actors or portions of the set, illuminating different areas in different colors, etc.

LED-based lighting technology offers the prospect of energy-efficient and customizable stage lighting. An LED (or "LED chip"), as used herein, refers to a light-emitting diode, i.e., a semiconductor device that emits light in response to electrical current. LEDs typically emit narrow-band light, with a central frequency that depends on the particular construction of the LED. At present, LEDs are commercially available at various wavelengths spanning the visible-light spectrum from red to violet; infrared and ultraviolet LEDs are also commercially available. LED chips are typically fabricated to include a light-emitting surface (which may be identified as the "top" surface) and at least two metal bonding pads, which are typically disposed on the top and/or bottom surfaces of the LED chip. In some cases, some or all of the light-emitting surface of the LED may be coated with a wavelength-shifting material (e.g., phosphor) that shifts some of the light emitted by the LED to a longer wavelength. For instance, a "white" LED can be created by applying yellow phosphor material to a blue LED chip or by other processes that provide light of a combination of wavelengths.

In application, LEDs are typically packaged into structures referred to as "emitters." As used herein, an "emitter" refers to a structure that includes one or more LEDs and additional structures that provide mechanical and electrical support for the LED(s) as well as transfer of heat away from the LED(s). For instance, an emitter typically includes a substrate (e.g., a ceramic substrate) that may be patterned with electrical contacts. The LED(s) can be mounted on the substrate and bonded to some of the electrical contacts; other electrical conducts may be used to connect the emitter to a current source to drive the LED(s). An emitter may also include a cover disposed over the LED(s) to protect the LED(s) from the elements while allowing light to escape. The cover can be optically transparent and may incorporate wavelength-shifting elements, focusing or defocusing elements (e.g., a convex or concave surface that provides lensing behavior) diffusive elements, or the like. An emitter typically provides exposed electrical contacts that can be connected to an external power source to deliver operating current to the LED(s).

With present LED technology, a single emitter may not produce enough light for stage lighting and other applications. To increase light output, a number of LED emitters may be arranged on a printed-circuit board, with LEDs of different colors dispersed across the board. In some cases, each emitter may include LEDs of different colors that are independently drivable. Such lighting devices generally include secondary optical systems intended to provide a directed beam of uniform intensity and color and controllable spot size. Such optics, however, may increase the etendue of the lighting device, making it less effective for its intended purpose.

SUMMARY

Certain embodiments of the present invention relate to optical systems for multi-color, multi-emitter LED-based lighting devices with optimized etendue and color mixing. The lighting device can include an emitter plate (e.g., a printed circuit board) holding two or more emitters, where each emitter includes multiple LEDs, which may include LEDs of at least two different colors. The emitter plate holds the emitters in a fixed arrangement, and any number of emitters may be present. The optical system, which can be positioned in front of the emitter plate, includes a lens array that can be formed as a unitary structure made of a material that is transparent to optical wavelengths. The lens array can include a number of color-mixing rod members extending parallel to each other along an optical axis, with the color-mixing rod members being arranged and spaced so that the rear end of each color-mixing rod member aligns with a different one of the emitters on the emitter plate. The color-mixing rod members may each have, for example, a square, hexagonal, or octagonal cross-section and may be tapered to be narrower at the rear end than the forward end. In some embodiments, the forward ends of the color-mixing rod members may be merged into each other to form a unitary structure. In other embodiments, the forward end of each color mixing rod member can be shaped as a beam-forming element, and the beam-forming elements for all of the color-mixing rod members can merge to provide a single-piece beam-forming section of the lens array. The beam-forming section can include a nonplanar front surface feature aligned with the front end of each color-mixing rod member. In some embodiments, the nonplanar front surface feature can include a concave surface feature. In other embodiments, the nonplanar front surface feature can include a convex surface feature. The beam-forming section can also include a nonplanar rear surface feature aligned with the front end of each color-mixing rod member. For example, where the nonplanar front surface features are concave, the nonplanar rear surface features may be convex; alternatively, the rear surface features may be concave, or the rear surface may simply be planar. In a given embodiment, the shape of each nonplanar surface feature can be the same as the shape of each other nonplanar surface feature, and the shape can be selected based on a desired balance among design goals such as high color uniformity, low etendue, and high transmission efficiency. In some embodiments, additional optical components, such as a condenser lens group, may be placed in front the of lens array to further shape the output light beam.

The following detailed description, together with the accompanying drawings, provides a further understanding of the nature and advantages of the claimed invention.

BRIEF DESCRIPTION OF THE DRAWINGS

FIG. 3A shows a front perspective view, FIG. 3B a side view, FIG. 3C a front view, and FIG. 3D a rear view.

FIG. 4A shows a perspective view, FIG. 4B a side view, and FIG. 4C a cutaway view.

FIG. 6A shows a front perspective view, FIG. 6B a side view, FIG. 6C a front view, and FIG. 6D a rear view.

FIG. 7A shows a perspective view, FIG. 7B a side view, and FIG. 7C a cutaway view.

FIG. 9A shows a front perspective view, FIG. 9B a side view, FIG. 9C a front view, and FIG. 9D a rear view.

FIG. 10A shows a perspective view, and FIG. 10B a side view.

FIG. 13A shows a front perspective view, FIG. 13B a side view, FIG. 13C a front view, and FIG. 13D a rear view.

FIG. 14A shows a perspective view, and FIG. 14B shows a side view.

DETAILED DESCRIPTION

Certain embodiments of the present invention relate to optical systems for multi-color, multi-emitter LED-based lighting devices with optimized etendue and color mixing. The lighting device can include an emitter plate (e.g., a printed circuit board) holding two or more emitters, where each emitter includes multiple LEDs, which may include LEDs of at least two different colors. The emitter plate holds the emitters in a fixed arrangement, and any number of emitters may be present. The optical system, which can be positioned in front of the emitter plate, includes a lens array that can be formed as a unitary structure made of a material that is transparent to optical wavelengths. The lens array can include a number of color-mixing rod members extending parallel to each other along an optical axis, with the color-mixing rod members being arranged and spaced so that the rear end of each color-mixing rod member aligns with a different one of the emitters on the emitter plate. The color-mixing rod members may each have, for example, a square, hexagonal, or octagonal cross-section and may be tapered to be narrower at the rear end than the forward end. In some embodiments, the forward ends of the color-mixing rod members may be merged into each other to form a unitary structure. In other embodiments, the forward end of each color mixing rod member can be shaped as a beam-forming element, and the beam-forming elements for all of the color-mixing rod members can merge to provide a single-piece beam-forming section of the lens array. The beam-forming section can include a nonplanar front surface feature aligned with the front end of each color-mixing rod member. In some embodiments, the nonplanar front surface feature can include a concave surface feature. In other embodiments, the nonplanar front surface feature can include a convex surface feature. The beam-forming section can also include a nonplanar rear surface feature aligned with the front end of each color-mixing rod member. For example, where the nonplanar front surface features are concave, the nonplanar rear surface features may be convex; alternatively, the rear surface features may be concave, or the rear surface may simply be planar. In a given embodiment, the shape of each nonplanar surface feature can be the same as the shape of each other nonplanar surface feature, and the shape can be selected based on a desired balance among design goals such as high color uniformity, low etendue, and high transmission efficiency. In some embodiments, additional optical components, such as a condenser lens group, may be placed in front the of lens array to further shape the output light beam.

Figure 1:
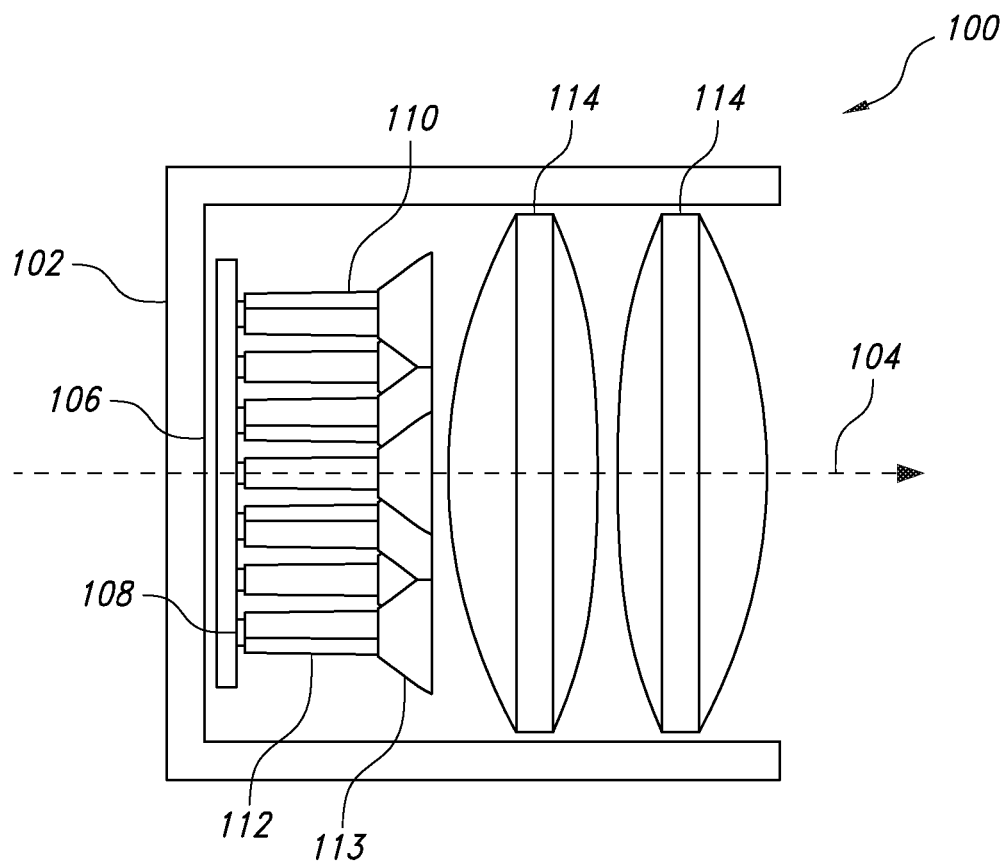
FIG. 1 shows a simplified cutaway side view of a lighting device according to an embodiment of the present invention.

FIG. 1 shows a simplified cutaway side view of a lighting device 100 according to an embodiment of the present invention. Lighting device 100 has a housing 102 that can be made of an opaque material. Housing 102 can be radially symmetric about a central optical axis 104 of lighting device 100. Housing 102 can include internal mechanical fittings (not shown) to hold various internal components in place and external fittings (not shown) to enable mounting of and external electrical connections to lighting device 100.

Emitter plate 106 can be positioned and secured at the rear of housing 102. Emitter plate 106 can hold a number of LED emitters 108. In one example described below, emitter plate 106 holds thirteen LED emitters 108; however, a particular number of LED emitters 108 is not required. External electrical connections (not shown) to emitter plate 106 can be provided through housing 102.

A lens array 110 is positioned in front of emitter plate 106. As described below, lens array 110 can include a color-mixing rod member 112 extending toward each LED emitter 108 and a beam-forming section 113. The rear surfaces of color-mixing rod members 112 may be in contact with top surfaces of LED emitters 108, and alignment structures may be formed in the rear surfaces of color-mixing rod members 112 and/or the front of LED emitters 108. Color-mixing rod members 112 can provide color mixing of light emitted from each LED emitter 108, and beam-forming section 113 can create a uniform light distribution across the front surface of lens array 110. Lens array 110 can also provide a collimating effect, directing output light along the direction of optical axis 104. Additional optical components, such as condenser lens group 114, can be positioned in front of lens array 110 to provide further shaping (e.g., collimation) of the light beam.

Figure 2A:
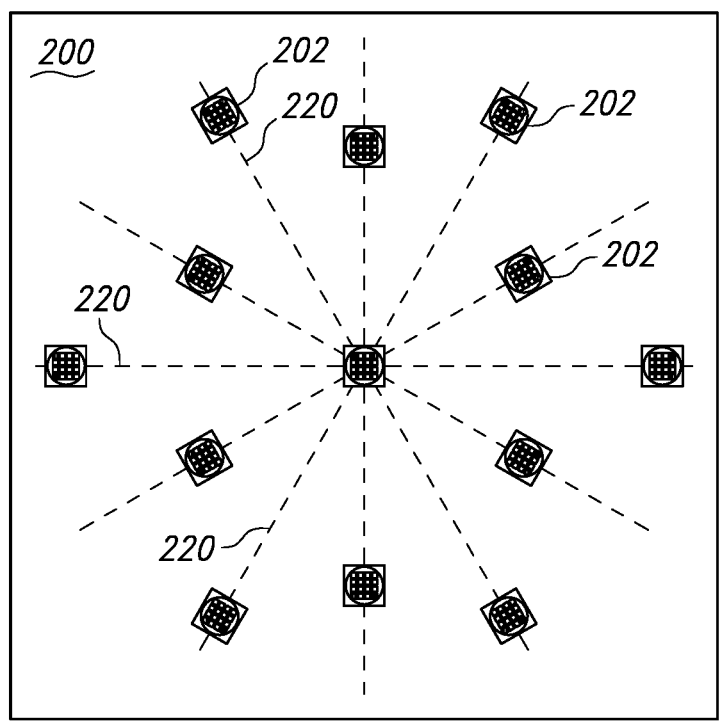
FIG. 2A shows a simplified front view of an emitter plate that can be used in some embodiments of the present invention.

FIG. 2A shows a simplified front view of an emitter plate 200 (e.g., implementing emitter plate 106) that can be used in some embodiments of the present invention. Emitter plate 200 can be formed, e.g., as a printed circuit board on which electrical paths (not shown) are defined. A number of LED emitters 202 (e.g., implementing LED emitters 108) can be arranged on emitter plate 200. In this example, thirteen LED emitters 202 are arranged in a hexagonally symmetric pattern; in other embodiments, a different number and/or arrangement of emitters may be substituted.

Figure 2B:
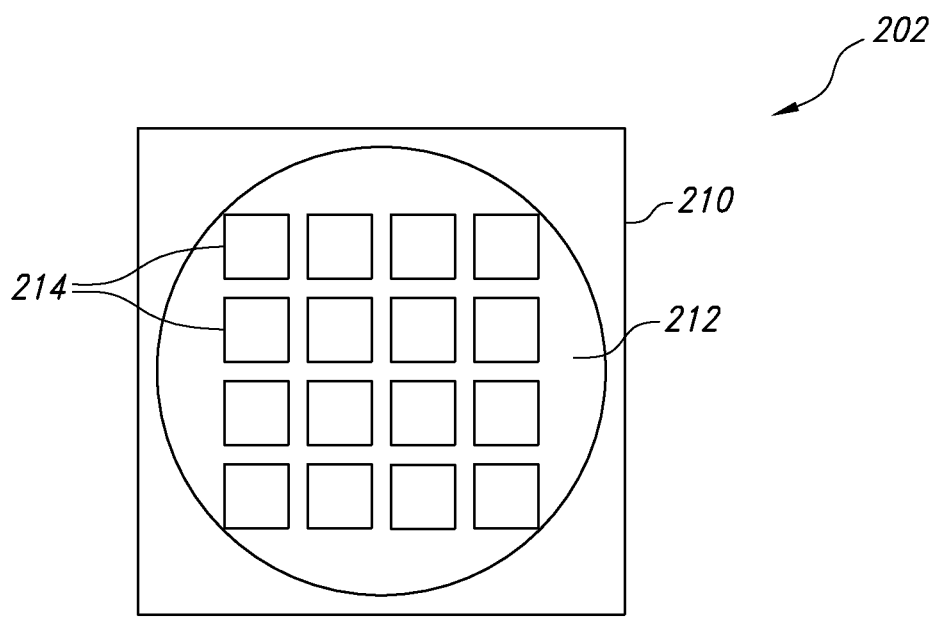
FIG. 2B shows a simplified top view of a representative LED emitter for the emitter plate of FIG. 2A.

Each LED emitter 202 can include multiple LEDs of different colors. FIG. 2B shows a simplified top view of a representative LED emitter 202. In this example, LED emitter 202 is formed on a ceramic base 210 that has a recess region 212 formed therein. LED chips 214 (individual semiconductor dies that emit light in response to applied current) are arranged in recess region 212. In some embodiments, LED chips 214 are spaced as closely together as practical, and flip-chip LEDs can be used to provide close spacing. Recess region 212 can be covered by an optically transparent cover (not shown), the outer surface of which may be flat or rounded as desired.

Although not strictly required, LED chips 214 can include LED chips of two or more different colors. For instance, the sixteen LED chips 214 as shown may include four each of red, green, blue, and amber LED chips. Other numbers and combinations of LED chips can be used, e.g., twelve LEDs with three each of red, green, blue, and white LED chips. In another example, LED chips 214 can include chips of seven colors: red, green, royal blue, cyan, aquamarine, amber, and phosphor-converted lime. Ceramic base 210 can provide electrical paths (not shown) to independently supply current to different subsets of LED chips 214. For instance, each LED chip 214 can have its own current supply, or multiple LED chips 214 of the same color can be connected together to receive the same current; as used herein, an "independently addressable group" of LEDs refers to a set of one or more LEDs within an emitter that receives an independently-controlled current.

Referring again to FIG. 2A, each LED emitter 202 on emitter plate 200 can be of similar or identical design, so that LEDs of a given color are distributed across the surface of emitter plate 200. Different LED emitters 202 can be rotated at different angles in the plane transverse to the optical axis. In the example shown, LED emitters 202 are rotated at angles corresponding to dotted guide lines 220 such that each LED emitter 202 in a hexagonal group is rotated by 60 degrees relative to the next LED in the same hexagonal group. (In the drawing, two corner LEDs in each LED emitter 202 have been shaded to further show the rotational angles.) Other rotational angles may be chosen depending on the arrangement of LED emitters 202 on emitter plate 200. In some embodiments of the present invention, rotation of the LED emitters can facilitate color mixing by a lens array such as lens array 110 of FIG. 1; examples are described below.

Emitter plate 200 can provide electrical paths to deliver currents to emitters 202. The electrical paths can be connected such that like LED chips 214 in each LED emitter 202 receive the same driving current. For instance, if each LED emitter 202 includes a red LED, the red LEDs in each emitter 202 would all receive the same current.

Accordingly, in some embodiments, emitter plate 200 can emit light of any desired color in response to appropriate input currents. In some embodiments, the input currents can be controlled by external circuitry (not shown). In other embodiments, emitter plate 200 can include control and driver circuits (not shown) to generate input currents in response to external control signals. The particular control system is not relevant to understanding the claimed invention.

In operation, emitter plate 200 can emit light of a controllable color from LED chips 214 of LED emitters 202. In some cases, a desired color is achieved by supplying current to LED chips 214 of different colors within each LED emitter 202, and the emitted light from different LED chips 214 needs to be mixed in order to provide a uniform appearance. Further, light is emitted from a set of discrete areas on the front side of emitter plate 202, and the light output directly from emitter plate 202 can have a "speckled" appearance rather than appearing as a uniform beam.

In accordance with some embodiments of the present invention, a more uniform light beam of a desired color can be formed from light emitted from emitter plate 202 by using a lens array such as lens array 110 of FIG. 1. Lens array 110 can have a rear color-mixing section (e.g., color-mixing rod members 112) to receive and color-mix the light from each LED emitter 202 and a beam-forming section (e.g., compound lens section 113) to shape the light from color-mixing rod members 112 into a wider and more uniform beam. Thus, lens array 110 can provide a uniform light beam, which can be further shaped by additional optics within or external to lighting device 100.

Figure 3A:
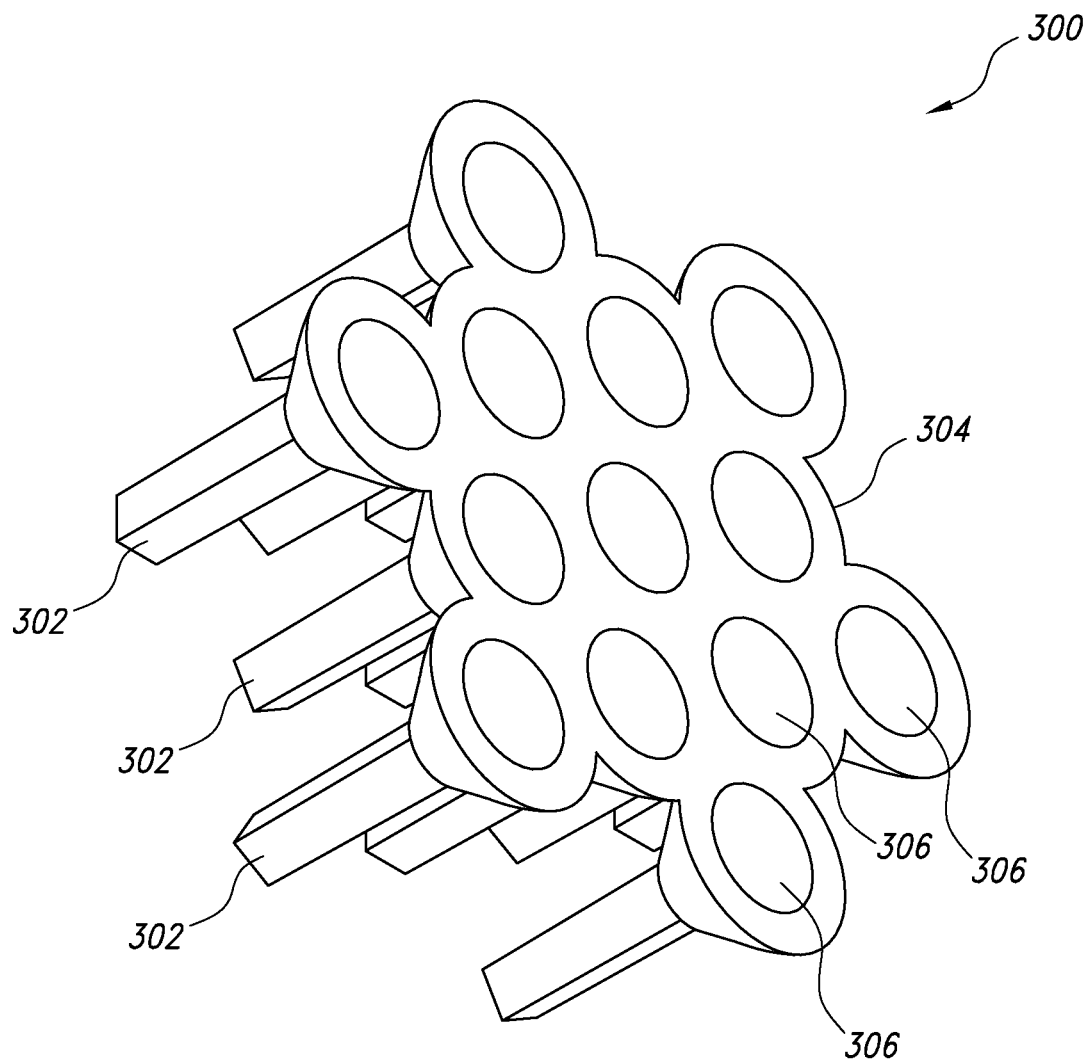
FIGS. 3A-3D show different views of a lens array according to an embodiment of the present invention.
Figure 3B:
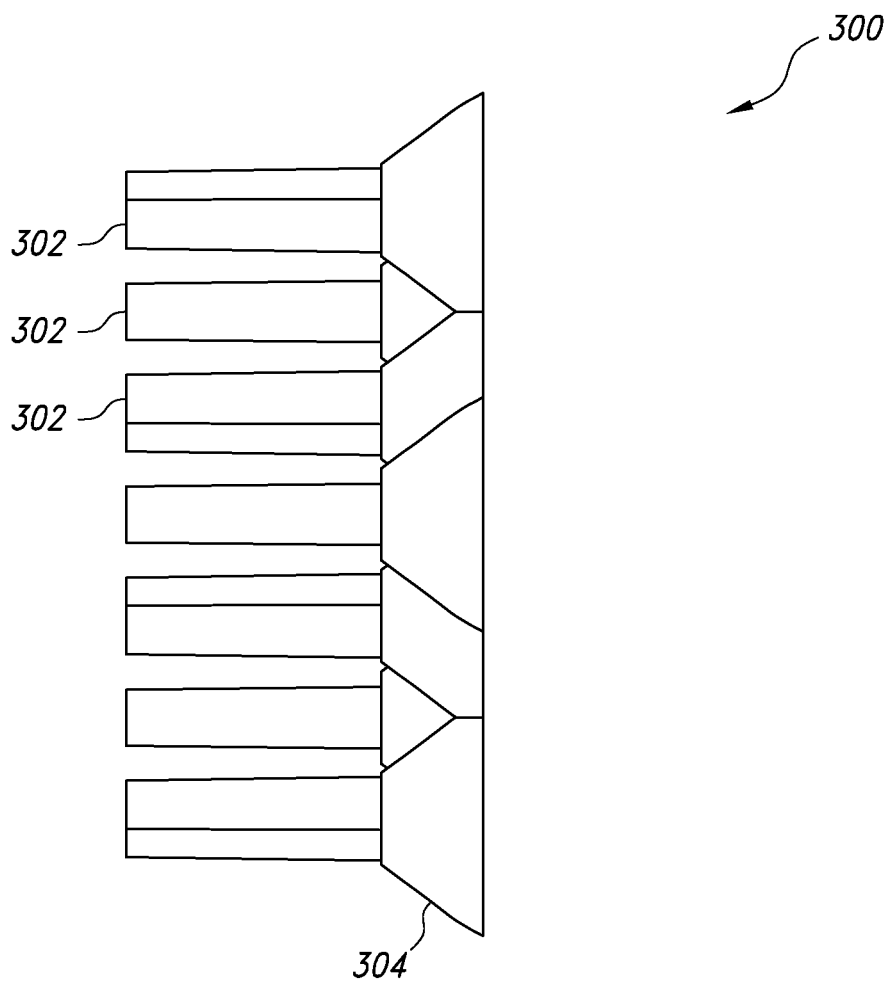
Figure 3C:
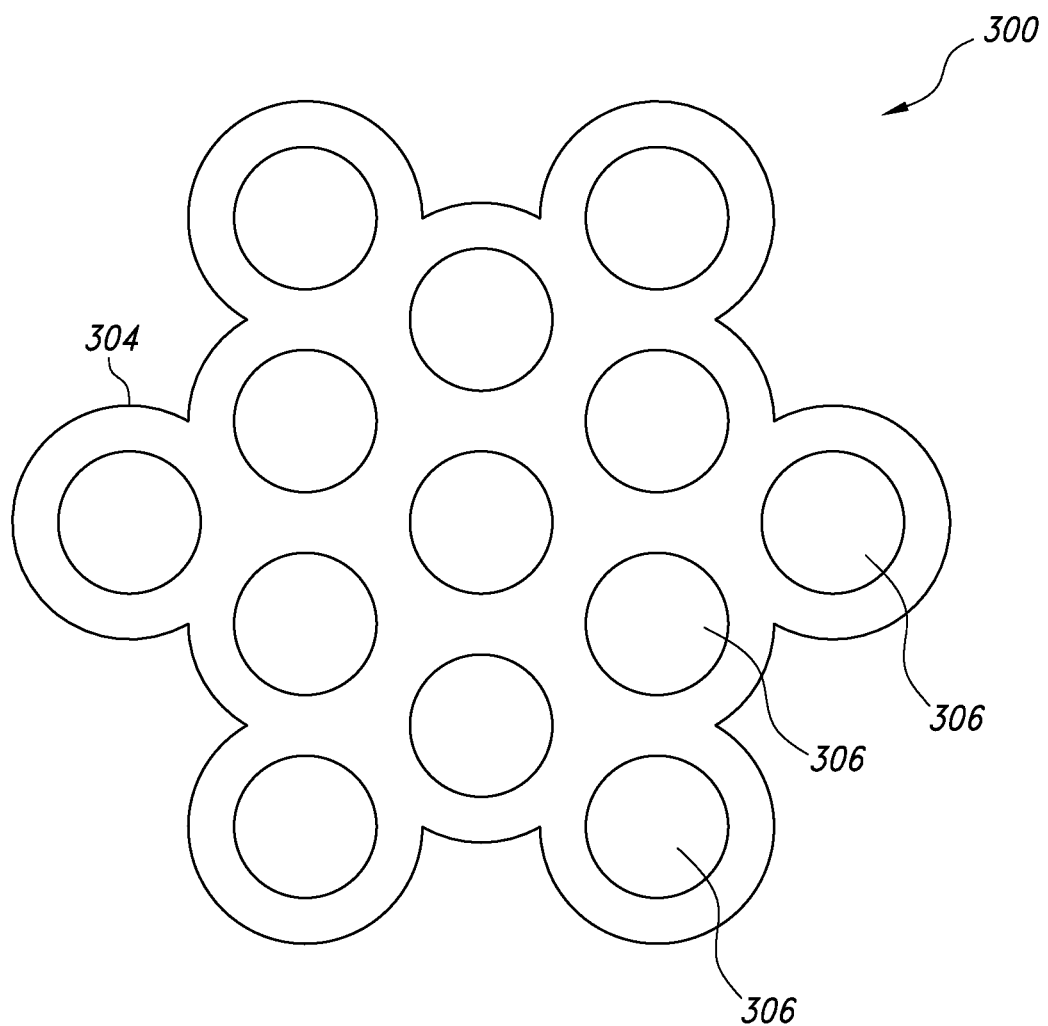
Figure 3D:
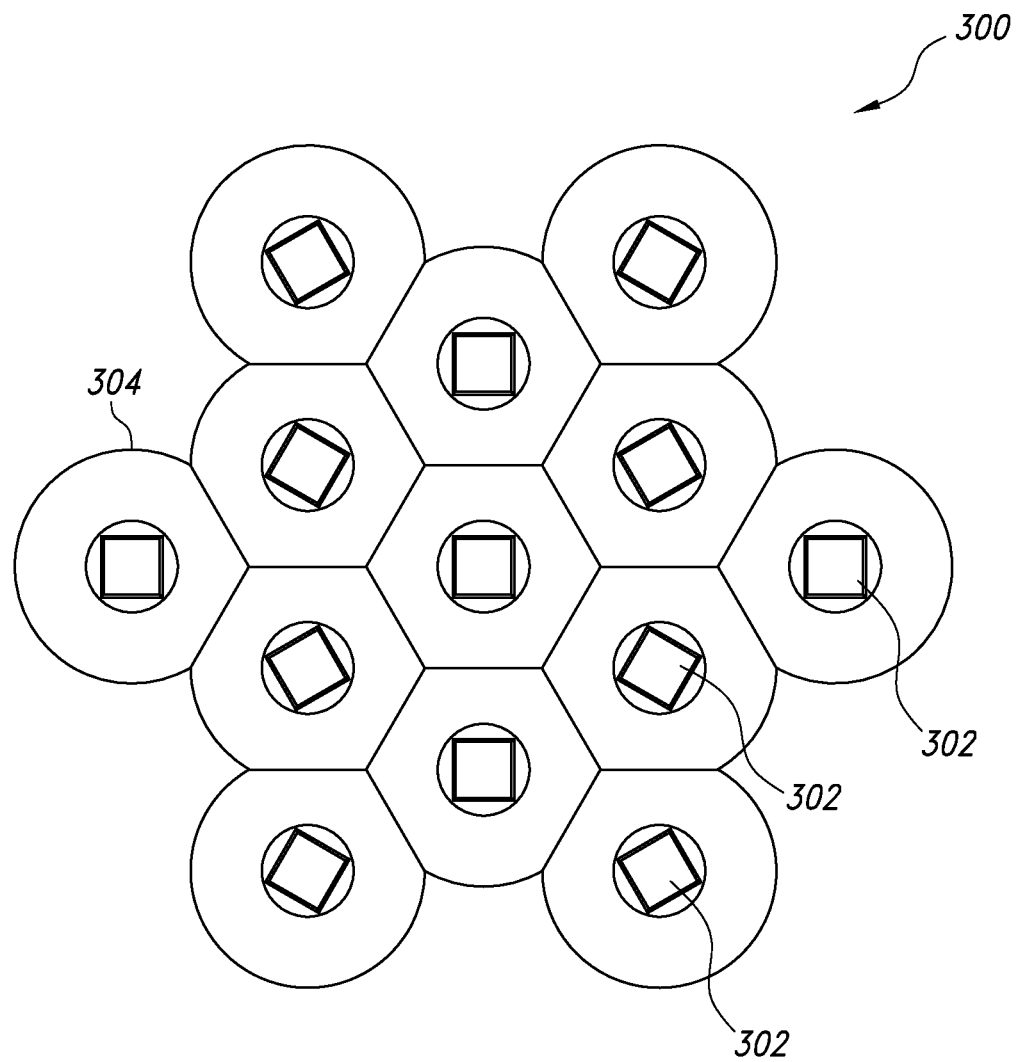

The design of lens array 110 involves tradeoffs between brightness and/or etendue and color uniformity. In some embodiments, high color uniformity can be achieved by shaping individual beam-forming elements in beam-forming section 113 to have a convex rear surface and a concave front surface. FIGS. 3A-3D show different views of a lens array 300 that can be used as lens array 110 according to an embodiment of the present invention. FIG. 3A shows a front perspective view, FIG. 3B a side view, FIG. 3C a front view, and FIG. 3D a rear view. Lens array 300 can be made of an optically transparent material such as poly (methyl methacrylate) (PMMA) or other optically transparent plastic or glass. As shown, lens array 300 includes a set of color-mixing rod members 302 extending parallel to each other along an axis and a beam-forming section 304 formed at the front ends of color-mixing rod members 302. Color-mixing rod members 302 are arranged to align with a specific arrangement of LED emitters (e.g., LED emitters 202 arranged on emitter plate 200 of FIG. 2A). In this example, color-mixing rod members 302 have square cross sections, and each color-mixing rod member 302 is oriented so that its cross section corresponds to the rotation angle of the corresponding one of LED emitters 202 shown in FIG. 2A. Beam-forming section 304 has a number of nonplanar (concave in this example) front surface features 306, with each feature 306 being aligned with a different one of color-mixing rod members 302.

Figure 4A:
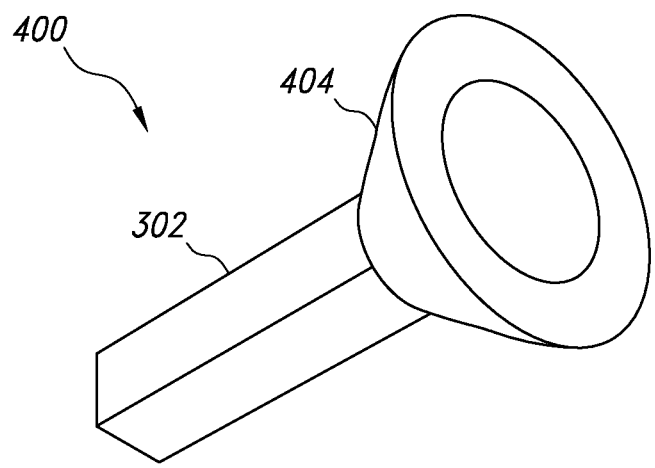
FIGS. 4A-4C show views of a single lens element from the lens array of FIGS. 3A-3D according to an embodiment of the present invention.
Figure 4B:
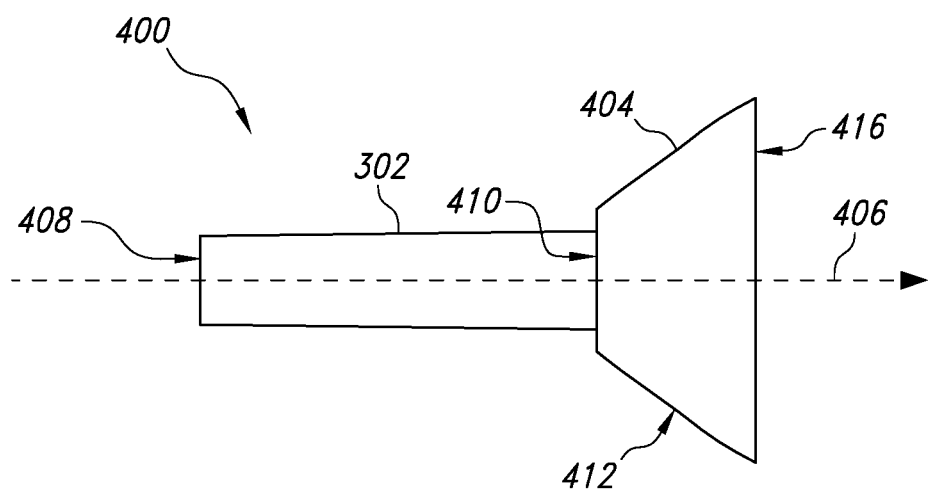
Figure 4C:
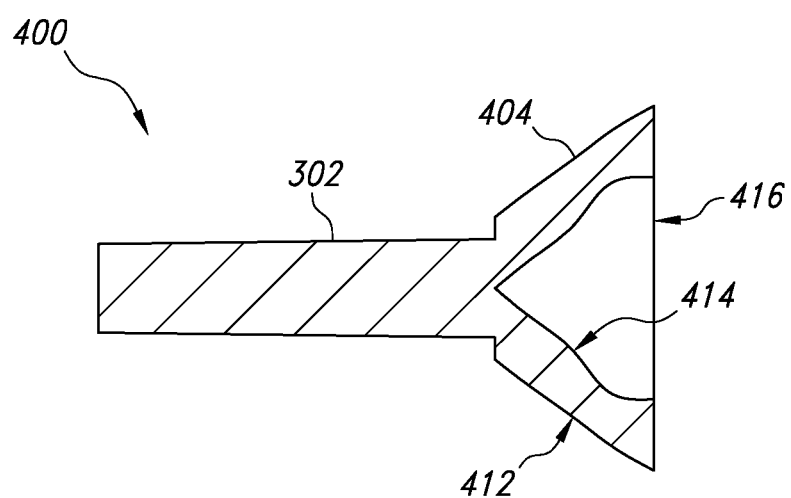

Lens array 300 can be formed as a unitary structure, e.g., by a molding process. Thus, lens array 300 can be made as a single, integrally-formed object. Unitary construction can avoid light loss that may occur at surface interfaces and can facilitate alignment of optical elements. For purpose of description, however, lens array 300 can be understood as a compound optical structure composed of nearly identical lens elements arranged in parallel. FIGS. 4A-4C show views of a single lens element 400 from lens array 300 according to an embodiment of the present invention. FIG. 4A shows a perspective view, FIG. 4B a side view, and FIG. 4C a cutaway view.

As shown in FIGS. 4A-4C, lens element 400 includes one color-mixing rod member 302 and one cup-like beam-forming element 404 arranged along an optical axis 406 (shown in FIG. 4B). Color-mixing rod member 302 can have a square or rectangular cross section in the plane transverse to optical axis 406. In some embodiments, color-mixing rod member 302 has tapered sides, so that the cross section at rear end 408 is smaller than the cross section at front end 410. The particular dimensions can be optimized for a specific LED emitter using optical modeling techniques. By way of example, for a particular LED emitter with twelve LED chips, rear end 408 of color-mixing rod member 302 has a width of 5.6 mm, the front end of color-mixing rod member 302 has a width of 6.0 mm, and color-mixing rod member 302 has a length of 25 mm. Color-mixing rod member 302 can provide total internal reflection of light emitted from an LED emitter (e.g., LED emitter 202 of FIG. 2B) placed at rear end 408, with a transmission efficiency that depends in part on the emission profile of LED emitter 202 and in part on the geometry of color-mixing rod member 302. For a flat-top LED emitter 202, most emitted light would be at a small angle to optical axis 406, so the transmission efficiency can be fairly high. Thus, light originating from different LED chips 214 within LED emitter 202 can be mixed during propagation through color-mixing rod member 302 toward front end 410.

Beam-forming element 404 can receive light from front end 410 of color-mixing rod member 302. Beam-forming element 404 can be shaped to provide total internal reflection at rear surface 412. Front surface 414 can have a concave shape to provide uniformity and collimation of light exiting from a front end 416 of lens array 400. Optimal surface profiles for directing line from a given LED emitter can be determined by optical modeling. By way of example, Table 1 provides surface profile parameters for a specific implementation of beam-forming element 404 optimized for a particular LED emitter with twelve LED chips; in this example, beam-forming element 404 has a length of 10 mm along optical axis 406. In Table 1, the "Z" dimension corresponds to optical axis 406, with origin (Z=0) at front end 410 of color-mixing rod member 302 (which is also the back end of beam-forming element 404), and the Y dimension is orthogonal to the Z dimension.

TABLE 1

| Z (mm) | Inner surface Y (mm) | Outer surface Y (mm) |
| --- | --- | --- |
| 0 | 0 | 4.50 |
| 2.5 | 1.95 | 6.34 |
| 5.0 | 4.12 | 8.20 |
| 7.5 | 6.64 | 10.07 |
| 10.0 | 7.00 | 11.50 |

Referring again to FIGS. 3A-3D, lens array 300 can be understood as constructed from a number of lens elements 400, arranged such that the rear end 408 of each lens element 400 can be positioned in front of a different one of the LED emitters 202 on LED emitter plate 200. The beam-forming elements 404 of lens elements 400 define concave front surface features 306 of beam-forming section 304. For the emitter arrangement shown in FIG. 2A, lens array 300 has a honeycomb pattern. As can be seen in FIGS. 3A-3D, the spacing between lens elements 400 in lens array 300 can be such that adjacent beam-forming elements 404 overlap with (or merge into) each other. By way of example, for a lens array 300 optimized for a particular LED emitter with twelve LED chips, the front face can have a dimension of 100 mm at its widest point. Overlap of beam-forming elements 400 can allow light originating from different LED emitters to intermix, resulting in greater uniformity of the output light at the front face of lens array 300. Further, the overlap can facilitate fabrication of lens array 300 as a unitary structure, which simplifies alignment during assembly of a lighting device such as lighting device 100 and avoids light loss at internal surface interfaces.

Figure 5:
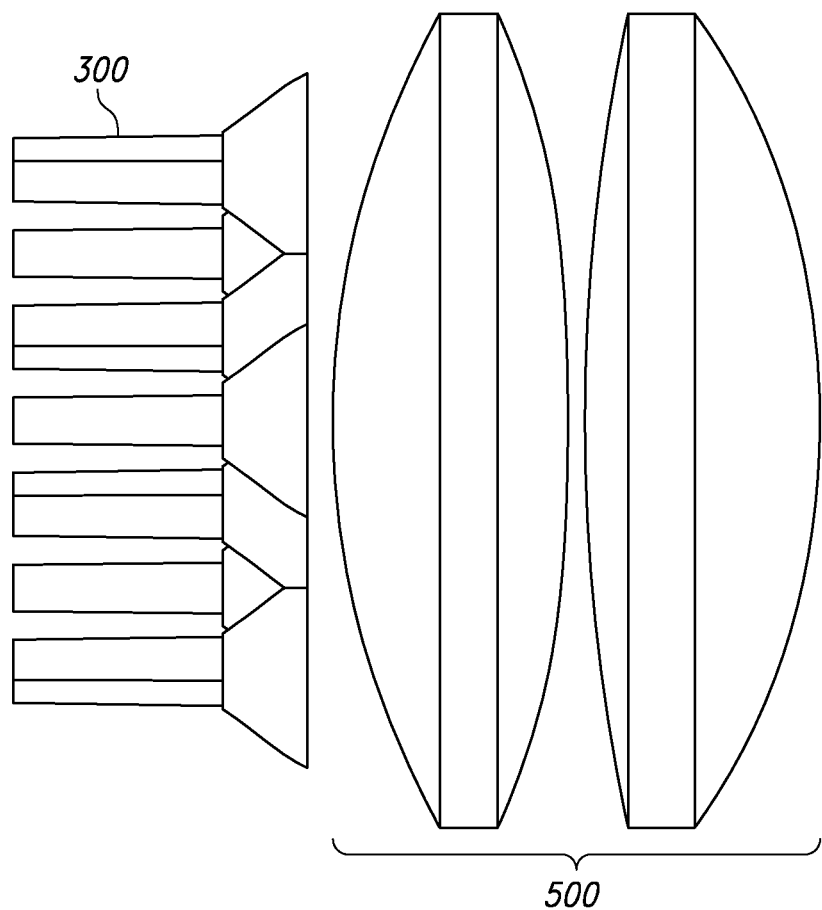
FIG. 5 shows an optical system according to an embodiment of the present invention.

Light emitted from the front surface of lens array 300 can be relatively uniform across the front surface and at least somewhat collimated. In some embodiments, further beam shaping can be provided by including additional optical elements in an optical system of a lighting device. By way of illustration, FIG. 5 shows a condenser lens pair 500 (e.g., implementing condenser lens group 114 of FIG. 1) placed in front of lens array 300 to form an optical system according to an embodiment of the present invention. Condenser lens pair 500 can be of generally conventional design using aspheric biconvex or plano-convex lenses and can be designed to further collimate the emitted light. In one example embodiment, condenser lens pair 500 has a total thickness of 57 mm, a diameter of 100 mm, back focal lengths of 109 mm and 114 mm. Those skilled in the art will appreciate that the particular geometry of a condenser lens group can depend on the specific application for which a particular lighting device is designed.

Figure 6A:
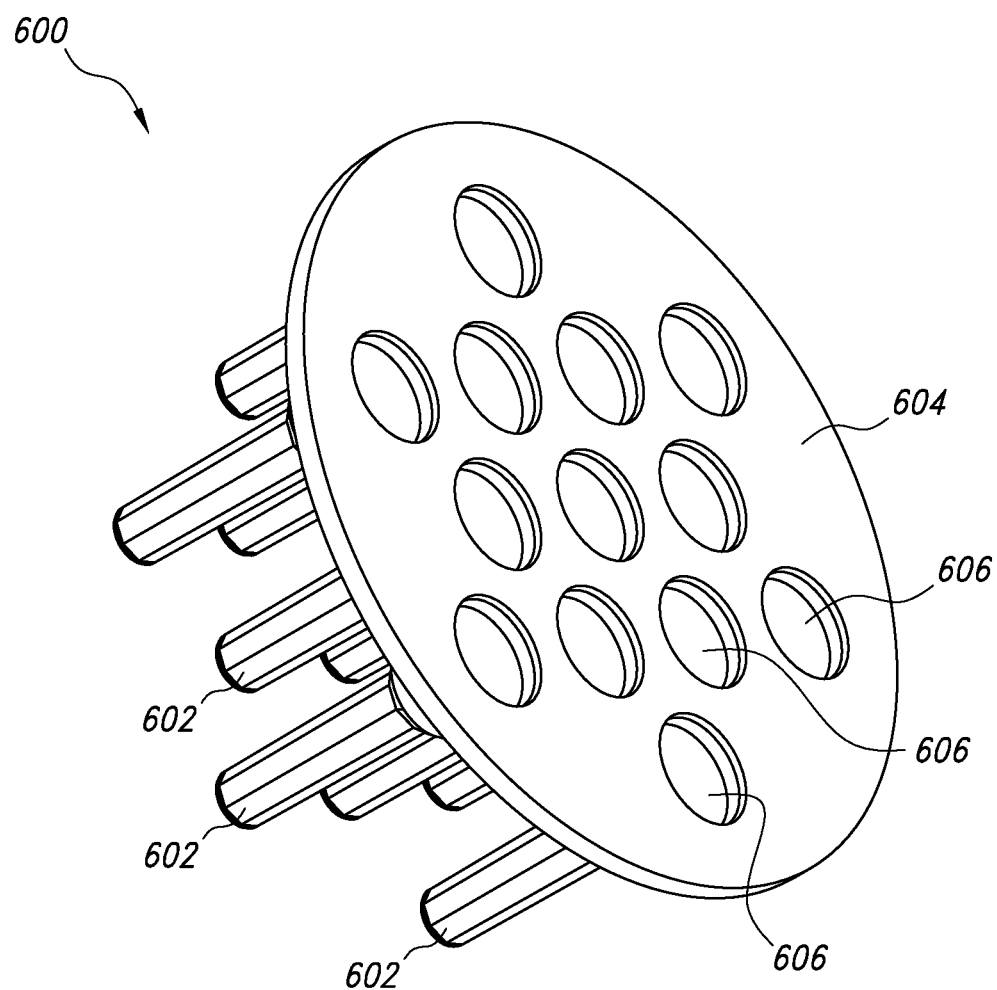
FIGS. 6A-6D show different views of a lens array according to an embodiment of the present invention.
Figure 6B:
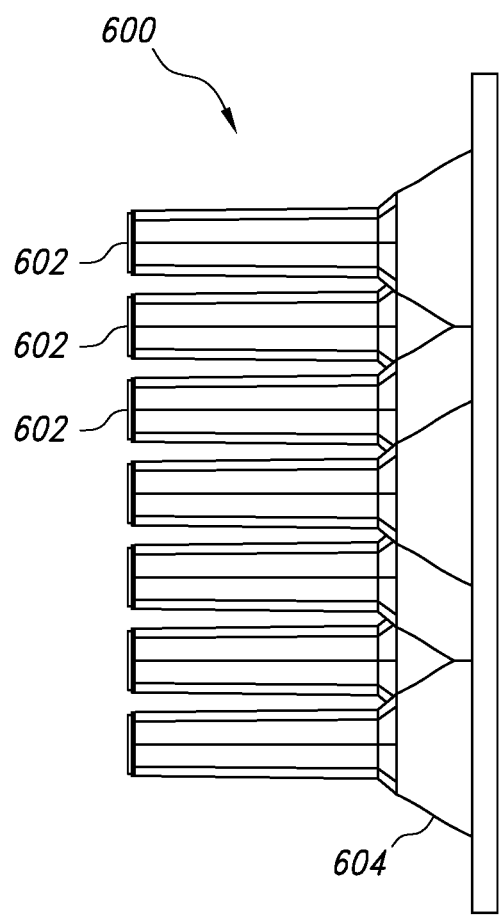
Figure 6C:
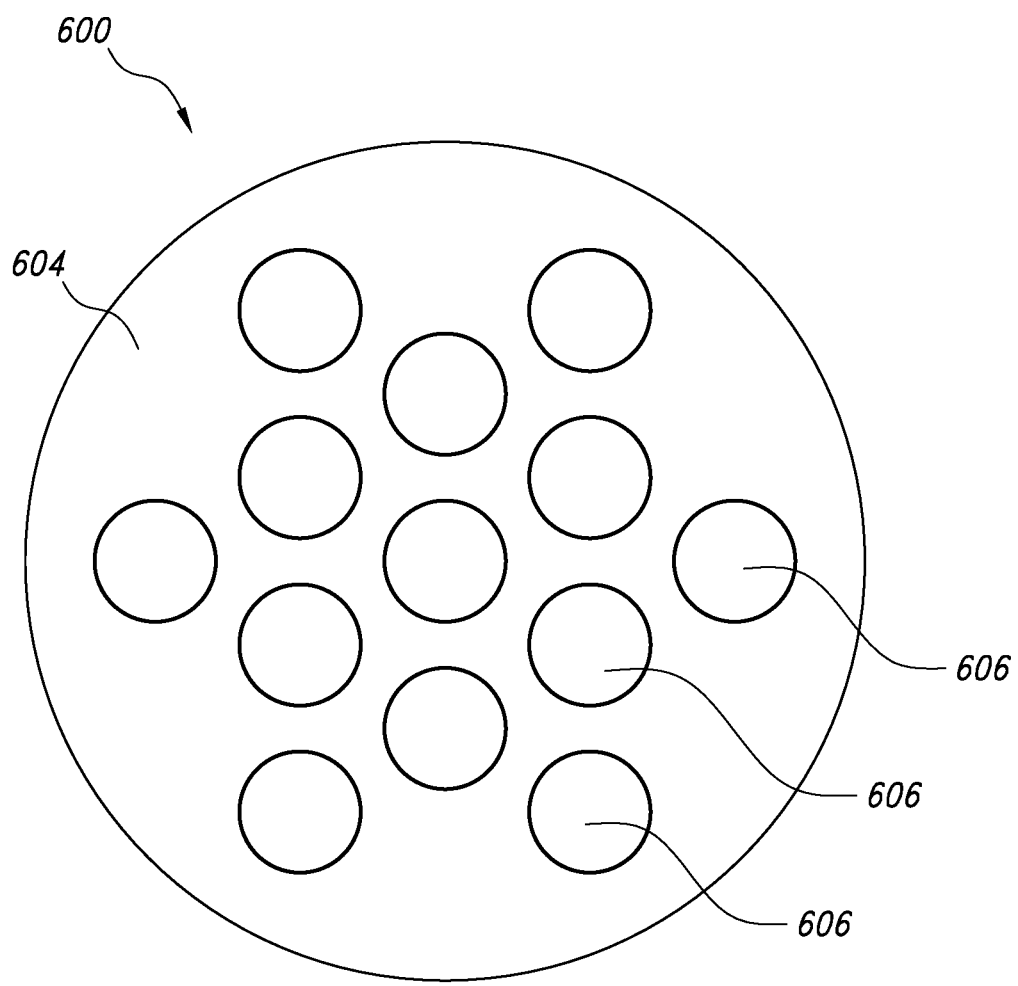
Figure 6D:
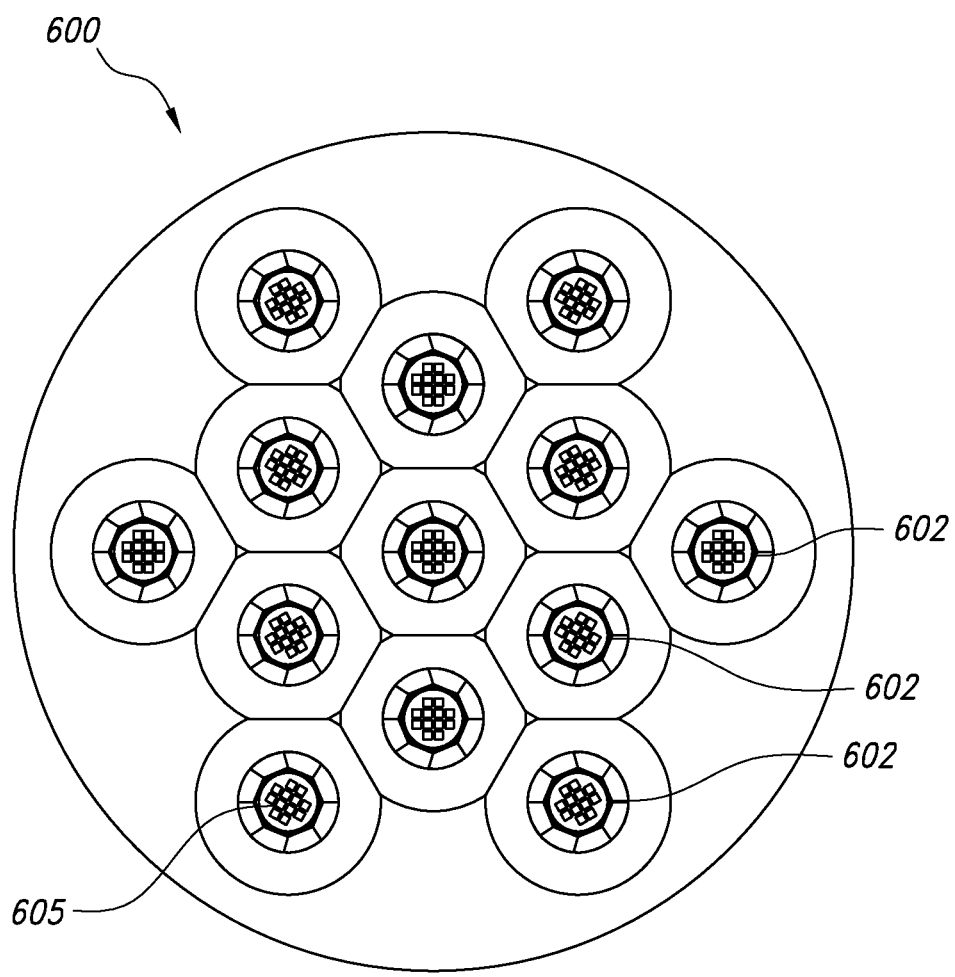

Lens array 300 can provide high color uniformity but some light is lost. In some embodiments, light transmission efficiency can be improved by modifying the outer surface of the lens elements to provide a smoother transition between the color mixing rod region and the beam-forming elements. FIGS. 6A-6D show different views of a lens array 600 that can be used as lens array 110 according to an embodiment of the present invention. FIG. 6A shows a front perspective view, FIG. 6B a side view, FIG. 6C a front view, and FIG. 6D a rear view. Lens array 600 can be made of an optically transparent material such as poly (methyl methacrylate) (PMMA) or other optically transparent plastic or glass. As shown, lens array 600 includes a set of color-mixing rod members 602 extending parallel to each other along an axis and a beam-forming section 604 formed at the front ends of color-mixing rod members 602. Color-mixing rod members 602 are arranged to align with a specific arrangement of LED emitters (e.g., LED emitters 202 arranged on emitter plate 200 of FIG. 2A); outlines of emitters 605 are indicated in FIG. 6D. In this example, color-mixing rod members 602 have octagonal cross sections. In some embodiments, each color-mixing rod member 602 can be oriented so that its cross section corresponds to the rotation angle of the corresponding one of LED emitters 202 shown in FIG. 2A; however, for color-mixing rod members 602 having octagonal cross section there is less benefit to modifying the rotation angle. Beam-forming section 604 has a number of nonplanar (concave in this example) front surface features 606, with each feature 606 being aligned with a different one of color-mixing rod members 602.

Figure 7A:
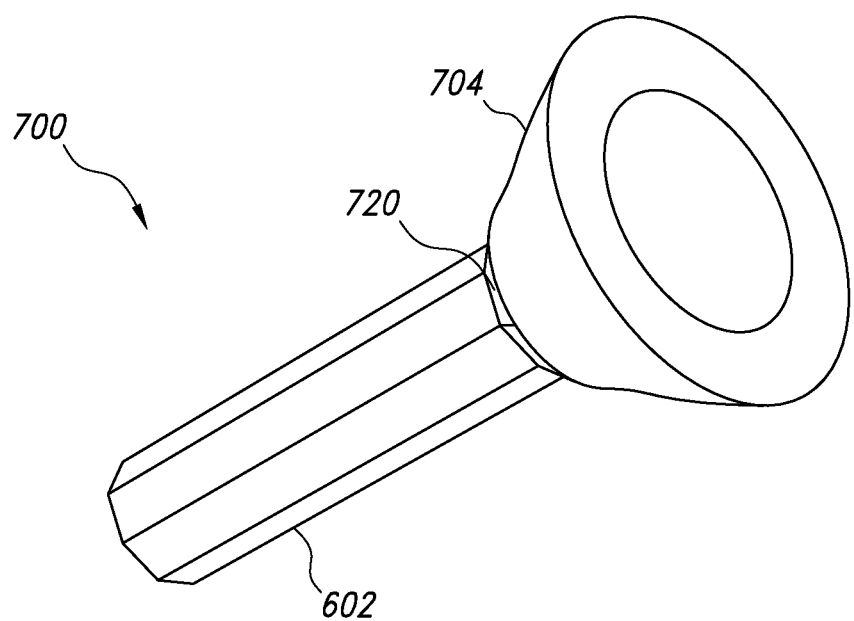
FIGS. 7A-7C show views of a single lens element from the lens array of FIGS. 6A-6D according to an embodiment of the present invention.
Figure 7B:
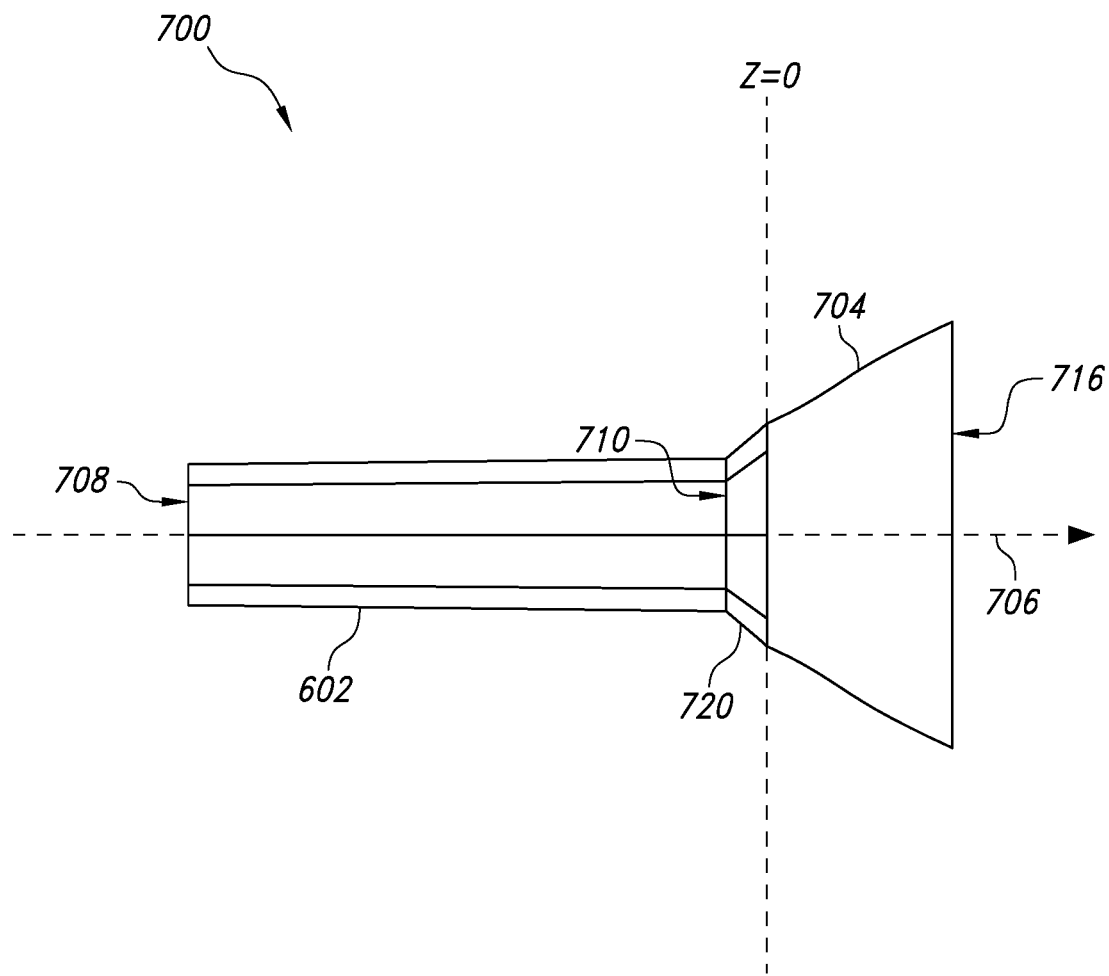
Figure 7C:
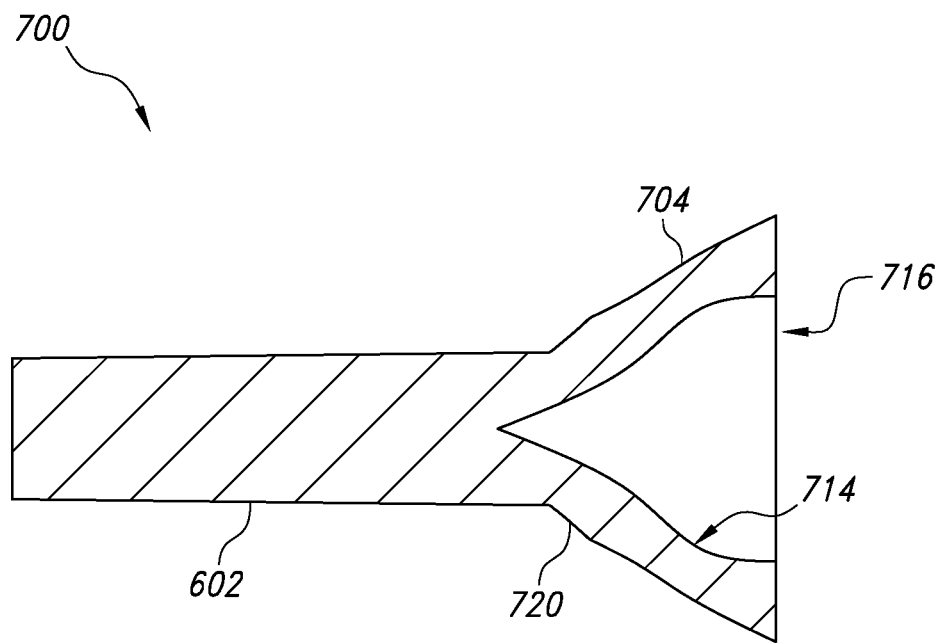

Lens array 600 can be formed as a unitary structure, e.g., by a molding process. Thus, lens array 600 can be made as a single, integrally-formed object. Unitary construction can avoid light loss that may occur at surface interfaces and can facilitate alignment of optical elements. For purpose of description, however, lens array 600 can be understood as a compound optical structure composed of nearly identical lens elements arranged in parallel. FIGS. 7A-7C show views of a single lens element 700 from lens array 600 according to an embodiment of the present invention. FIG. 7A shows a perspective view, FIG. 7B a side view, and FIG. 7C a cutaway view.

As shown in FIGS. 7A-7C, lens element 700 includes one color-mixing rod member 602 and one cup-like beam-forming element 704 arranged along an optical axis 706 (shown in FIG. 7B). Color-mixing rod member 602 can have an octagonal cross section in the plane transverse to optical axis 706; other cross-sections, such as square, hexagonal, or round cross-sections can be substituted. In some embodiments, color-mixing rod member 602 has tapered sides, so that the cross section at rear end 708 is smaller than the cross section at front end 710. The particular dimensions can be optimized for a specific LED emitter using optical modeling techniques. By way of example, for a particular LED emitter with twelve LED chips, rear end 708 of color-mixing rod member 602 has a radius of 3.8 mm (measured as the radius of a circumscribed circle on the rear octagonal surface), the front end of color-mixing rod member 602 has a radius of 4.1 mm (measured as the radius of a circumscribed circle on the front octagonal surface), and color-mixing rod member 602 has a length of 28.2 mm. Color-mixing rod member 602 can provide total internal reflection of light emitted from an LED emitter (e.g., LED emitter 202 of FIG. 2B) placed at rear end 708, with a transmission efficiency that depends in part on the emission profile of LED emitter 202 and in part on the geometry of color-mixing rod member 602. For a flat-top LED emitter 202, most emitted light would be at a small angle to optical axis 706, so the transmission efficiency can be fairly high. Thus, light originating from different LED chips 214 within LED emitter 202 can be mixed during propagation through color-mixing rod member 602 toward front end 710.

Beam-forming element 704 can receive light from front end 710 of color-mixing rod member 602. Beam-forming element 704 can be shaped to provide total internal reflection at rear surface 712. Front surface 714 can have a concave shape to provide uniformity and collimation of light exiting from a front end 716 of lens element 700. In addition, lens element 700 has a "collar" structure 720 at the front end 710 of color-mixing rod member 602, which provides a more gradual transition between the color-mixing rods and beam-forming elements than in lens array 300 described above. In the embodiment shown, collar structure 720 has an octagonal cross-section (aligned with the octagonal cross-section of color-mixing rod member 602). In one specific example, collar structure 720 has a length along optical axis 706 of 3 mm, the rear of collar structure 720 has a width of 4.1 mm (matching the front end of color-mixing rod member 602), and the front of collar structure 720 has a width of 6.0 mm (matching the width of beam-forming element 704 at the z=0 plane shown in FIG. 7B). Use of collar structure 720 or similar structures can reduce light loss relative to lens array 300; however, the surface profile of lens array 600 is more complex.

Optimal surface profiles for directing light from a given LED emitter can be determined by optical modeling. By way of example, Tables 2 and 3 provide surface profile parameters for a specific implementation of beam-forming element 704 optimized for a particular LED emitter with twelve LED chips; in this example, beam-forming element 704 has a length of 10 mm along optical axis 706. In Tables 2 and 3 the "Z" dimension corresponds to optical axis 706, with origin (Z=0 plane) at the front end of collar structure 720 (as shown in FIG. 7B), and the Y dimension is orthogonal to optical axis 706. In this example, as seen in FIG. 7C, the concave surface feature of beam-forming element 704 extends into collar structure 720 and color-mixing rod member 602.

TABLE 2

| Z (mm) | Inner surface Y (mm) |
| --- | --- |
| −5.0 | 0.0 |
| −1.25 | 1.5 |
| 2.5 | 3.7 |
| 6.25 | 6.6 |
| 10.0 | 7.2 |

TABLE 3

| Z (mm) | Outer surface Y (mm) |
| --- | --- |
| 0 | 6.0 |
| 2.5 | 7.3 |
| 5.0 | 8.9 |
| 7.5 | 10.3 |
| 10.0 | 11.5 |

Referring again to FIGS. 6A-6D, lens array 600 can be understood as constructed from a number of lens elements 700, arranged such that the rear end 708 of each lens element 700 can be positioned in front of a different one of the LED emitters 202 on LED emitter plate 200. The beam-forming elements 704 of lens elements 700 define front surface features 606 of beam-forming section 604. For the emitter arrangement shown in FIG. 2A, lens array 600 has a honeycomb pattern. As can be seen in FIGS. 6A-6D, the spacing between lens elements 700 can be such that adjacent beam-forming elements 704 overlap with (or merge into) each other. By way of example, for a lens array 600 optimized for a particular LED emitter with twelve LED chips, the front face can have a diameter of 100 mm. Overlap of beam-forming elements 700 can allow light originating from different LED emitters to intermix, resulting in greater uniformity of the output light at the front face of lens array 600. Further, the overlap can facilitate fabrication of lens array 600 as a unitary structure, which simplifies alignment during assembly of a lighting device such as lighting device 100 and avoids light loss at internal surface interfaces.

Figure 8:
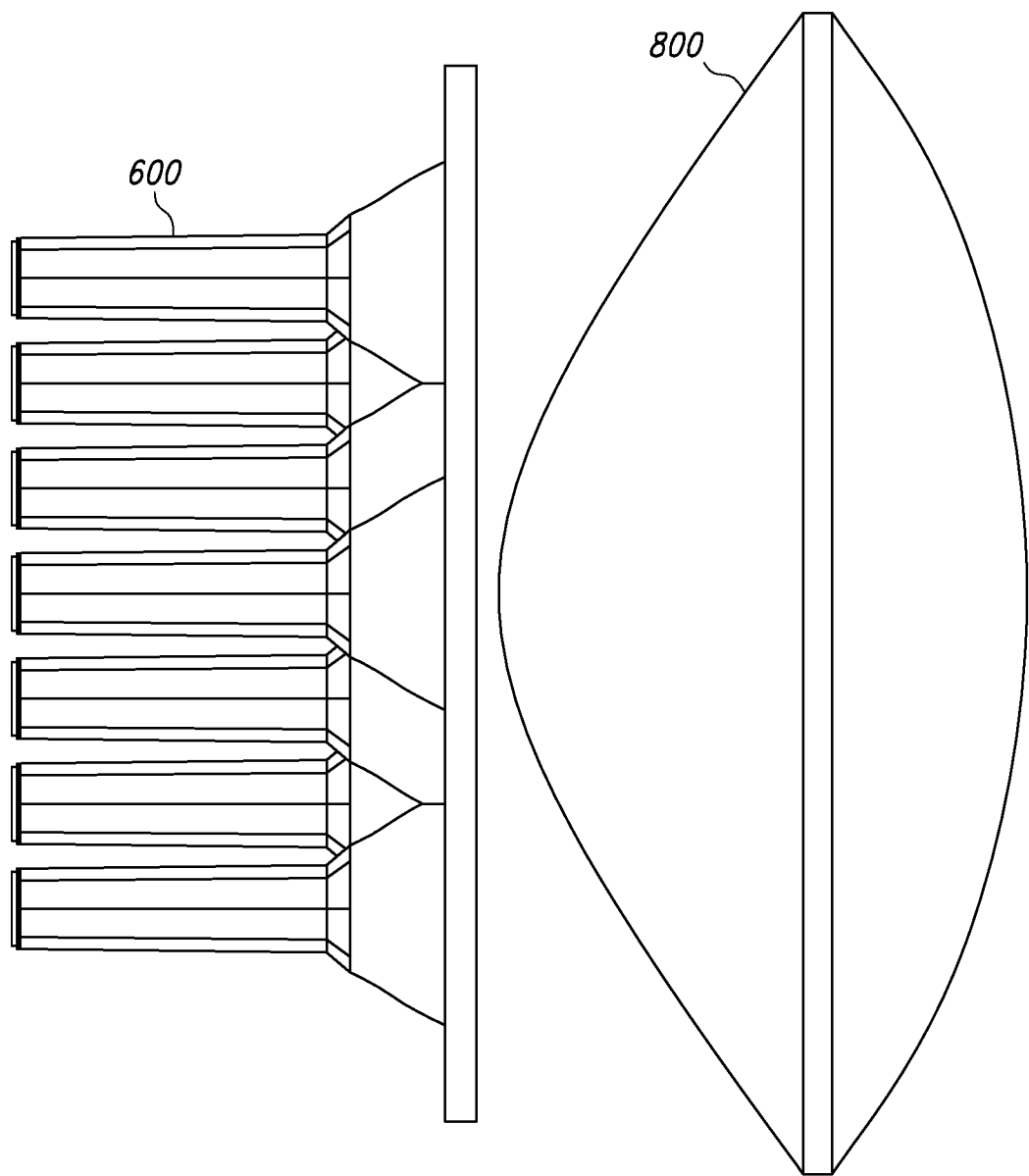
FIG. 8 shows an optical system according to an embodiment of the present invention.

Light emitted from the front surface of lens array 600 can be relatively uniform across the front surface and at least somewhat collimated. In some embodiments, further beam shaping can be provided by including additional optical elements in an optical system of a lighting device. By way of illustration, FIG. 8 shows a condenser lens 800 (e.g., implementing condenser lens group 114 of FIG. 1) placed in front of lens array 600 to form an optical system according to an embodiment of the present invention. Condenser lens 800 can be an aspheric biconvex lens designed to further collimate the emitted light. In this example, a single condenser lens 800, rather than a pair of lenses, is used. In one example embodiment, condenser lens 800 has a maximum thickness of 50 mm (on its optical axis), a diameter of 100 mm, and a back focal length of 41 mm. Those skilled in the art will appreciate that the particular geometry of a condenser lens can depend on the specific application for which a particular lighting device is designed.

As noted above, lens array 300 can provide high color uniformity. There is a tradeoff, however, in that lens array 300 may not maximize light output efficiency. Different lens array designs can improve light output efficiency, although color uniformity may decrease. An example of a lens array that provides a different design tradeoff will now be described.

Figure 9A:
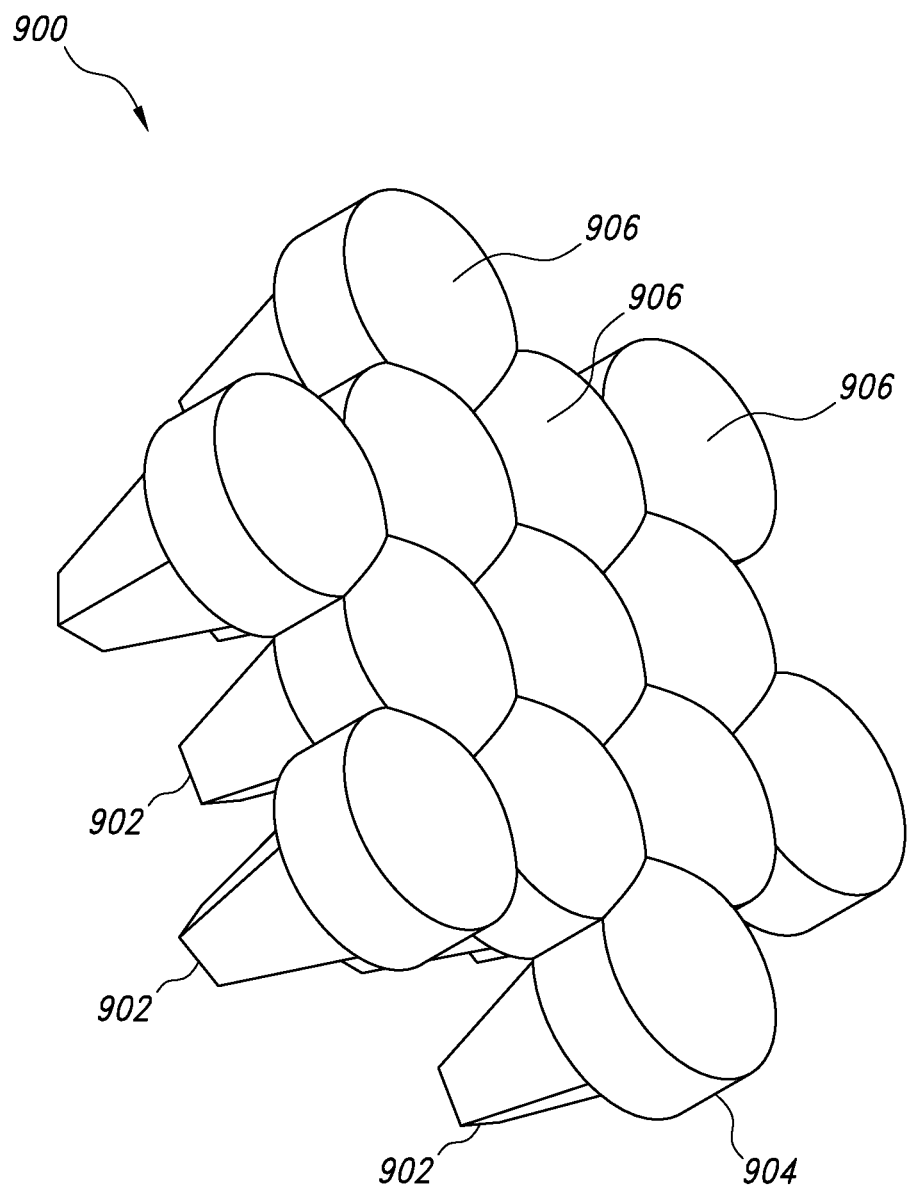
FIGS. 9A-9D show different views of a lens array according to an embodiment of the present invention.
Figure 9B:
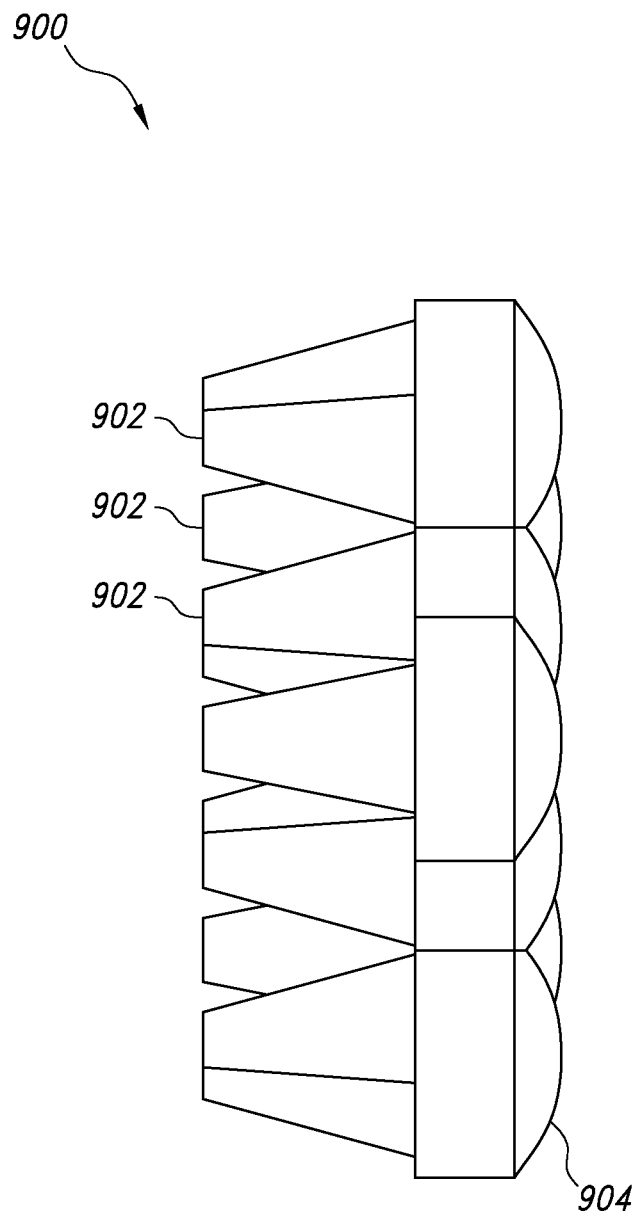
Figure 9C:
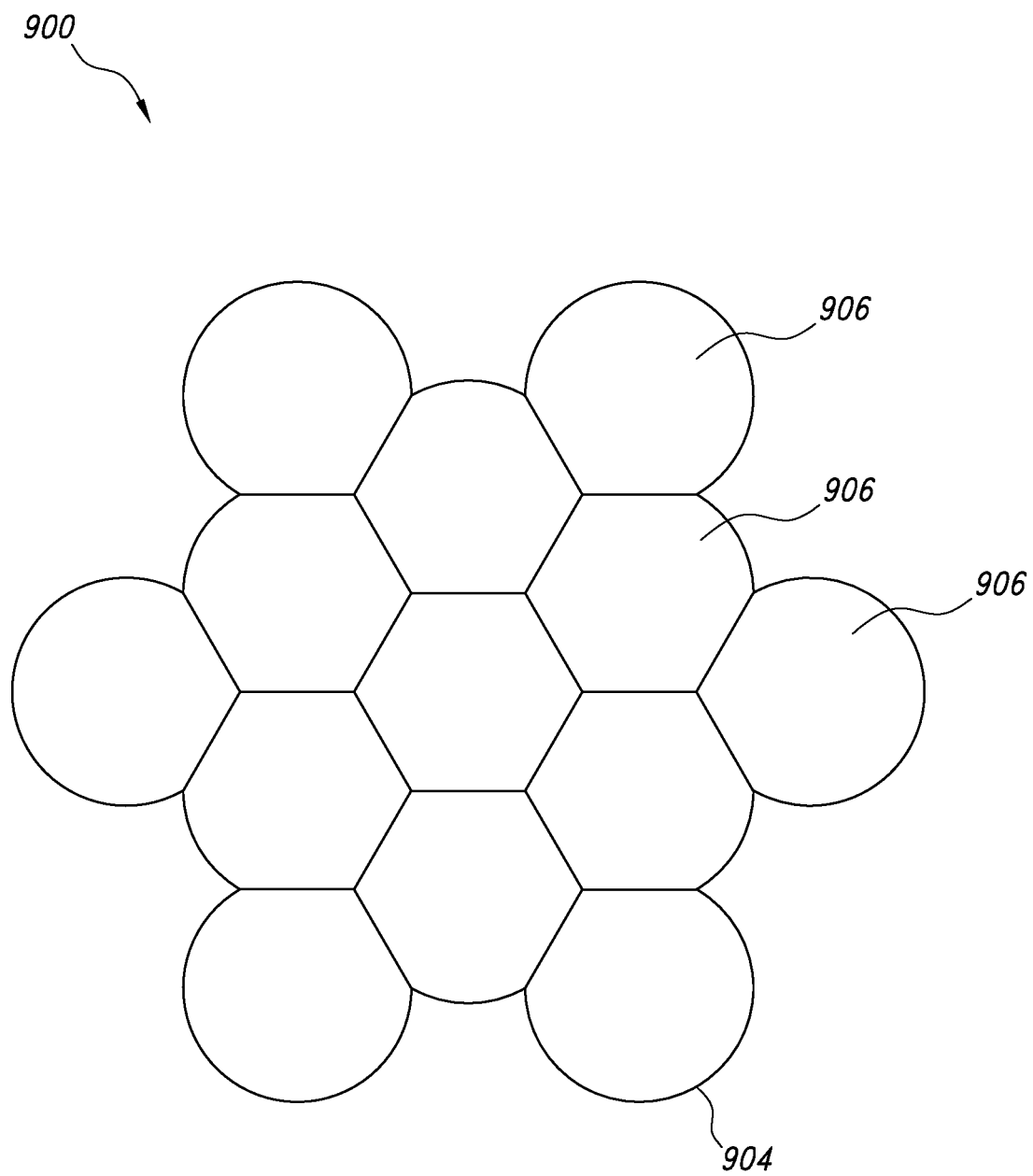
Figure 9D:
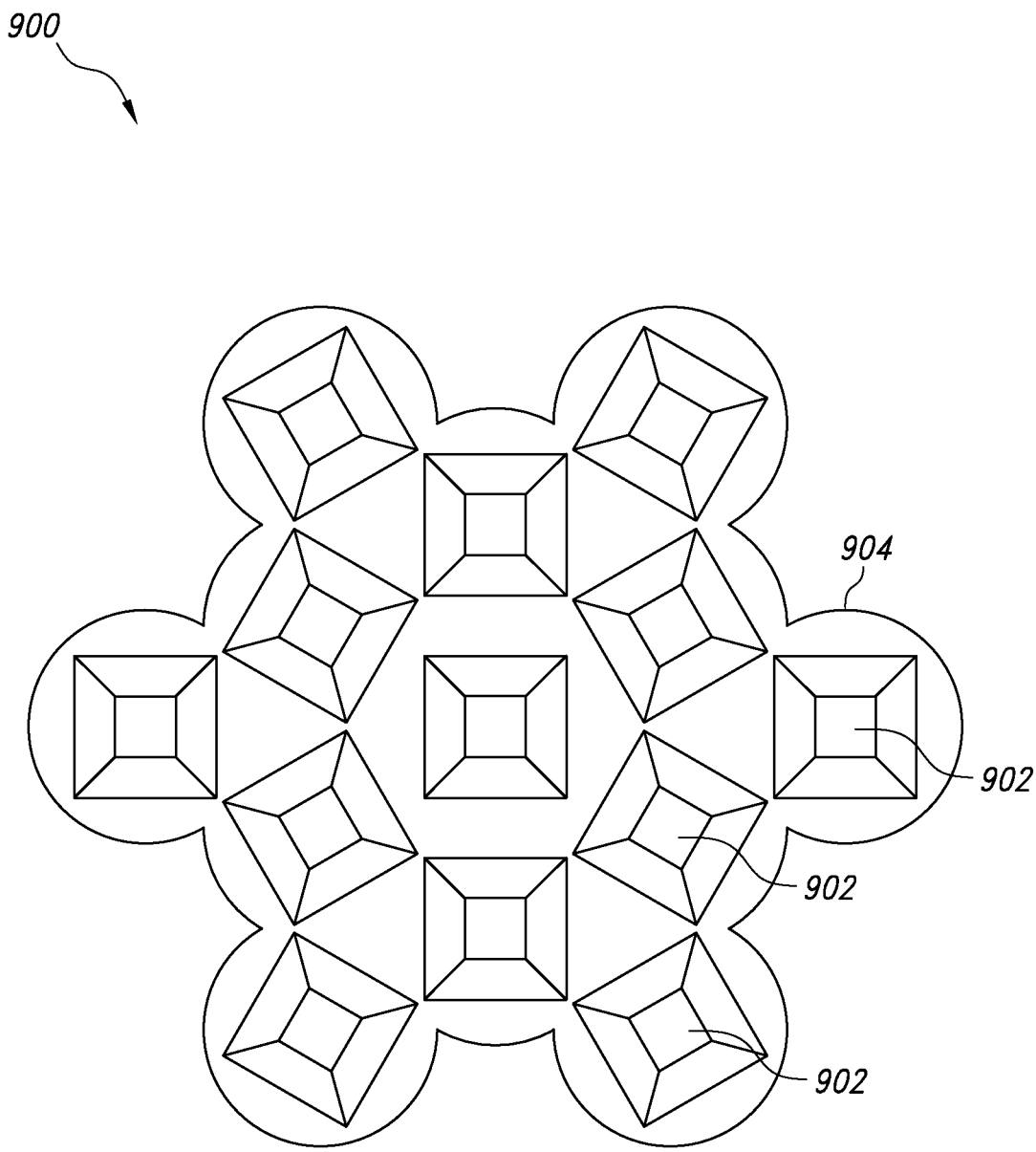

FIGS. 9A-9D show different views of a lens array 900 that can be used as lens array 110 according to another embodiment of the present invention. FIG. 9A shows a front perspective view, FIG. 9B a side view, FIG. 9C a front view, and FIG. 9D a rear view. Lens array 900 can be made of an optically transparent material such as PMMA or other optically transparent plastic or glass. As shown, lens array 900 includes a set of color-mixing rod members 902 extending parallel to each other along an axis and a beam-forming section 904 formed at the front of color-mixing rod members 902. Color-mixing rod members 902 are arranged to align with a specific arrangement of LED emitters (e.g., LED emitters 202 arranged on emitter plate 200 of FIG. 2). In this example, color-mixing rod members 902 have square cross sections, and each color-mixing rod member 902 is oriented so that its cross-section matches the orientation of the corresponding one of LED emitters 202 shown in FIG. 2A. Beam-forming section 904 has a number of nonplanar (convex in this example) front surface features 906, with each feature 906 being aligned with a different one of color-mixing rod members 902.

Figure 10A:
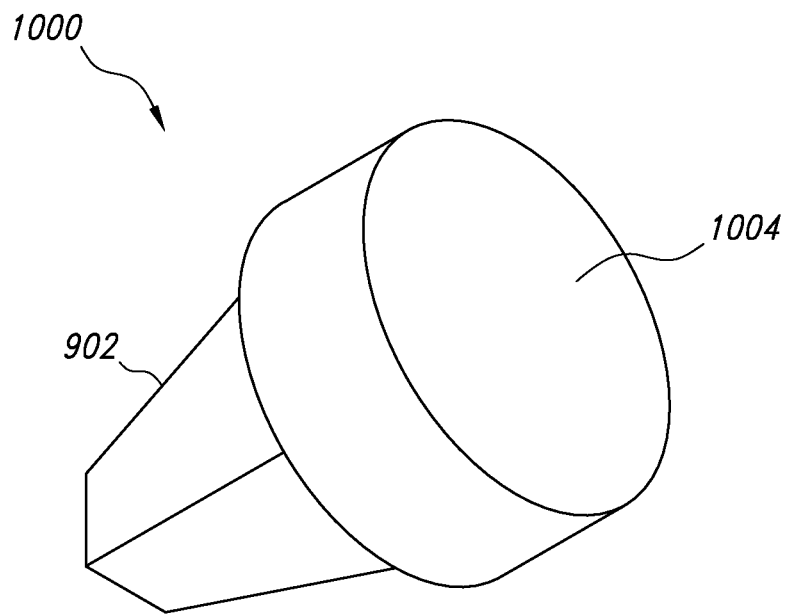
FIGS. 10A and 10B show views of a single lens element from the lens array of FIGS. 9A-9D according to an embodiment of the present invention.
Figure 10B:
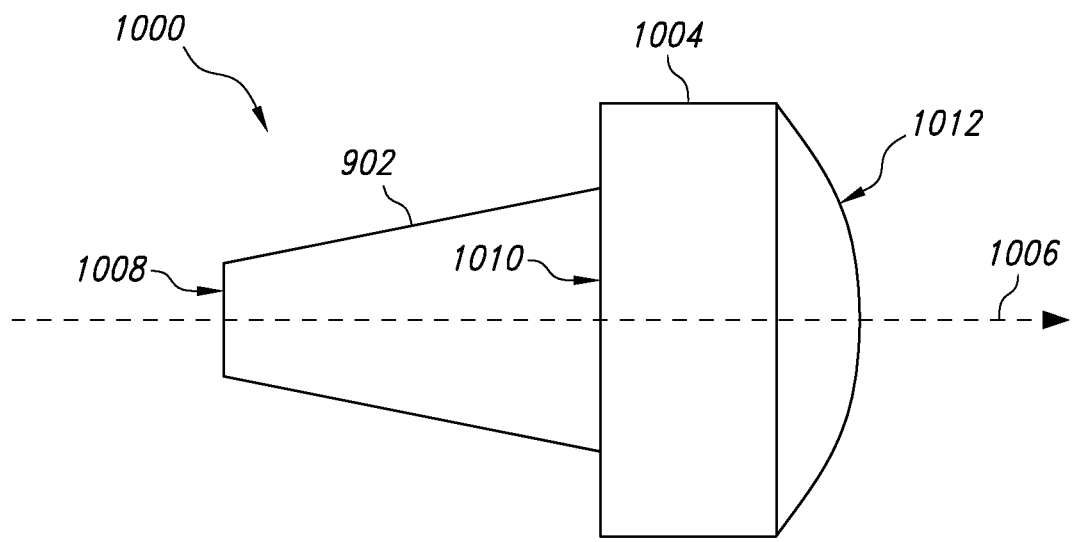

Like lens array 300 described above, lens array 900 can be formed as a unitary structure, e.g., by a molding process. For purpose of description, however, lens array 900 can be understood as a compound optical structure composed of nearly identical lens elements arranged in parallel. FIGS. 10A and 10B show views of a single lens element 1000 from lens array 900 according to an embodiment of the present invention. FIG. 10A shows a perspective view, and FIG. 10B a side view.

As shown in FIGS. 10A and 10B, lens element 1000 includes one color-mixing rod member 902 and one domed beam-forming element 1004 arranged along an optical axis 1006 (shown in FIG. 10B). Color-mixing rod member 902 can have a square or rectangular cross section in the plane transverse to optical axis 1006. In some embodiments, color-mixing rod member 902 has tapered sides, so that the cross section at rear end 1008 is smaller than the cross section at front end 1010. The particular dimensions can be optimized for a specific LED emitter using optical modeling techniques. By way of example, for a particular LED emitter with twelve LED chips, rear end 1008 of color-mixing rod member 902 has a width of 6 mm, the front end of color-mixing rod member 902 has a width of 14 mm, and color-mixing rod member 902 has a length of 20 mm. Color-mixing rod member 902 can provide total internal reflection of light emitted from an LED emitter (e.g., LED emitter 202 of FIG. 2B) placed at rear end 1008, with a transmission efficiency that depends in part on the emission profile of LED emitter 202 and in part on the geometry of color-mixing rod member 902. For a flat-top LED emitter 202, most emitted light would be at a small angle to optical axis 1006, so the transmission efficiency can be fairly high. Thus, light originating from different LED chips 214 within LED emitter 202 can be mixed during propagation through color-mixing rod member 902 toward front end 1010.

Beam-forming element 1004 can receive light from front end 1010 of color-mixing rod member 902. Beam-forming element 1004 can be shaped to provide a beam-spreading effect, with front surface 1012 being shaped as an aspheric convex lens. The thickness of beam-forming element 1004 along optical axis 1006 can support further color mixing. Optimal surface profiles for directing light from a given LED emitter can be determined by optical modeling. By way of example, Table 4 provides parameters for front surface 1012 of a specific implementation of beam-forming element 1004 optimized for a particular LED emitter with twelve LED chips; in this example, beam-forming element 1004 has a length of 15 mm along optical axis 406. Surface parameters are defined in terms of the standard aspheric lens surface profile equation:

$$Z(r) = \frac{Cr^2}{1 + \sqrt{1 - (1-k)C^2r^2}} + A_4 r^4 + A_6 r^6, \quad (1)$$

where Z is the sag of the surface along the direction of the optical axis, r is radial distance from the optical axis, C is the curvature (inverse of the radius), k is the conic constant, and $A_4$ and $A_6$ are aspheric terms.

TABLE 4

| Parameter | Value |
| --- | --- |
| Conic Constant (k) | 1.28512 |
| Curvature (C) | 0.040856 |
| $A_4$ | 0.000206 |
| $A_6$ | $-1.02 \times 10^{-6}$ |

Referring again to FIGS. 9A-9D, lens array 900 can be understood as constructed from a number of lens elements 1000, arranged such that the rear end 1008 of each lens element 1000 can be positioned in front of a different one of the LED emitters 202 on LED emitter plate 200. The beam-forming elements 1004 of lens elements 1000 define convex front surface features 906 of beam-forming section 904. For the emitter arrangement shown in FIG. 2A, lens array 900 has a honeycomb pattern. As can be seen in FIGS. 9A-9D, the spacing between lens elements 1000 can be such that adjacent beam-forming elements 1004 overlap with (or merge into) each other. By way of example, for a lens array 900 optimized for a particular LED emitter with twelve LED chips, the front face can have a dimension of 100 mm at its widest point. Overlap of beam-forming elements 1004 can allow light originating from different LED emitters to intermix, resulting in greater uniformity of the output light at the front face of lens array 900. Further, the overlap can facilitate fabrication of lens array 900 as a unitary structure, which simplifies alignment during assembly of a lighting device such as lighting device 100 and avoids light loss at internal surface interfaces.

Figure 11:
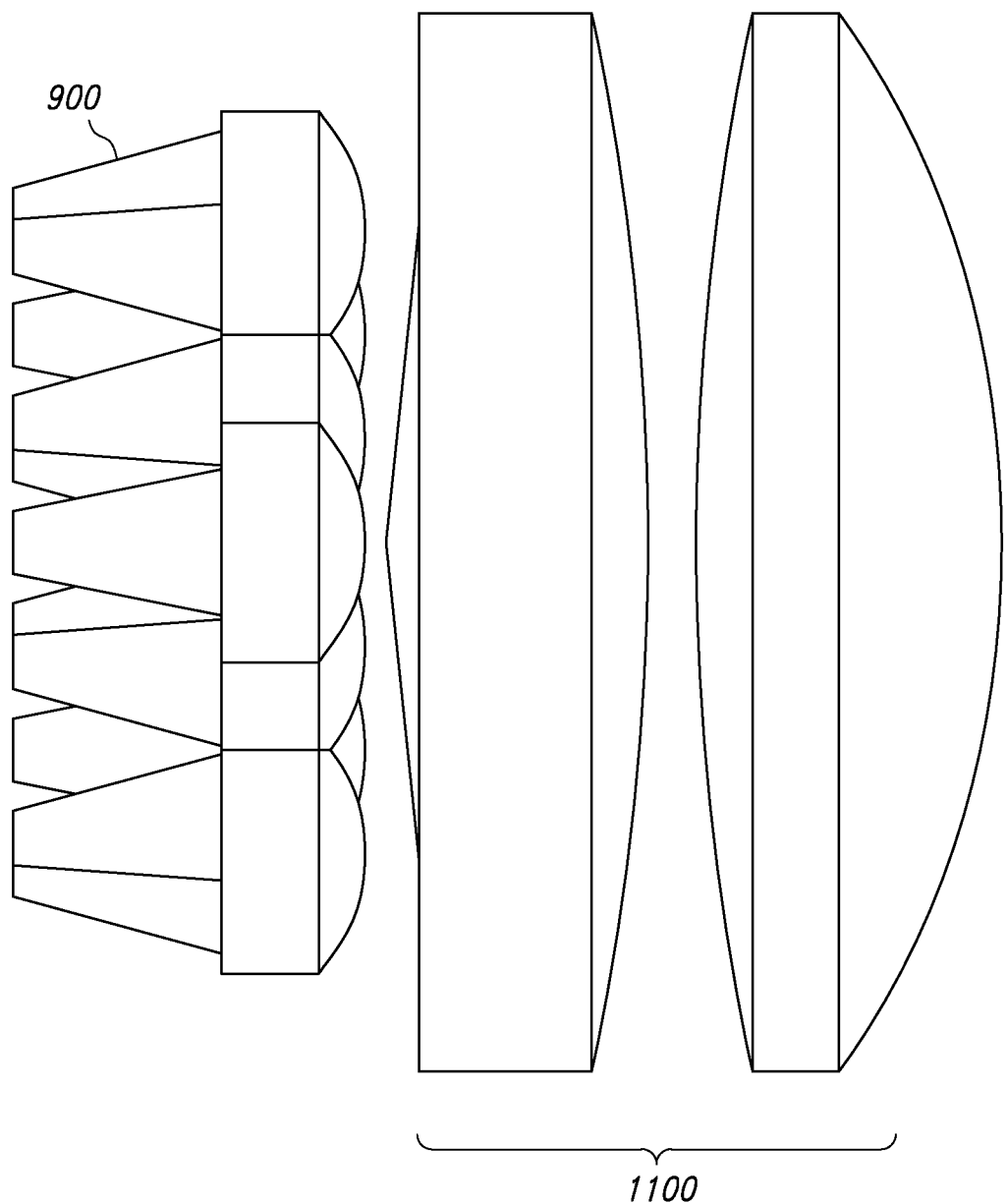
FIG. 11 shows an optical system according to an embodiment of the present invention.

Light emitted from the front surface of lens array 900 can be relatively uniform across the front surface and at least somewhat collimated. In some embodiments, further beam shaping can be provided using by including additional optical elements in an optical system of a lighting device. By way of illustration, FIG. 11 shows a condenser lens pair 1100 (e.g., implementing condenser lens group 114 of FIG. 1) placed in front of lens array 900 to form an optical system according to an embodiment of the present invention. Condenser lens pair 1100 can be of generally conventional design using aspheric biconvex or plano-convex lenses and can be designed to further collimate the emitted light. The particular parameters can be similar to parameters of condenser lens pair 500 described above. Those skilled in the art will appreciate that the particular geometry of a condenser lens group can depend on the specific application for which a particular lighting device is designed.

An alternative lens array uses closely-packed color mixing rods without front surface features to provide both color mixing and beam forming. This allows more emitters to be provided in a lighting device of a given area, increasing the maximum light output (for a given emitter design) and preserving low etendue.

Figure 12:
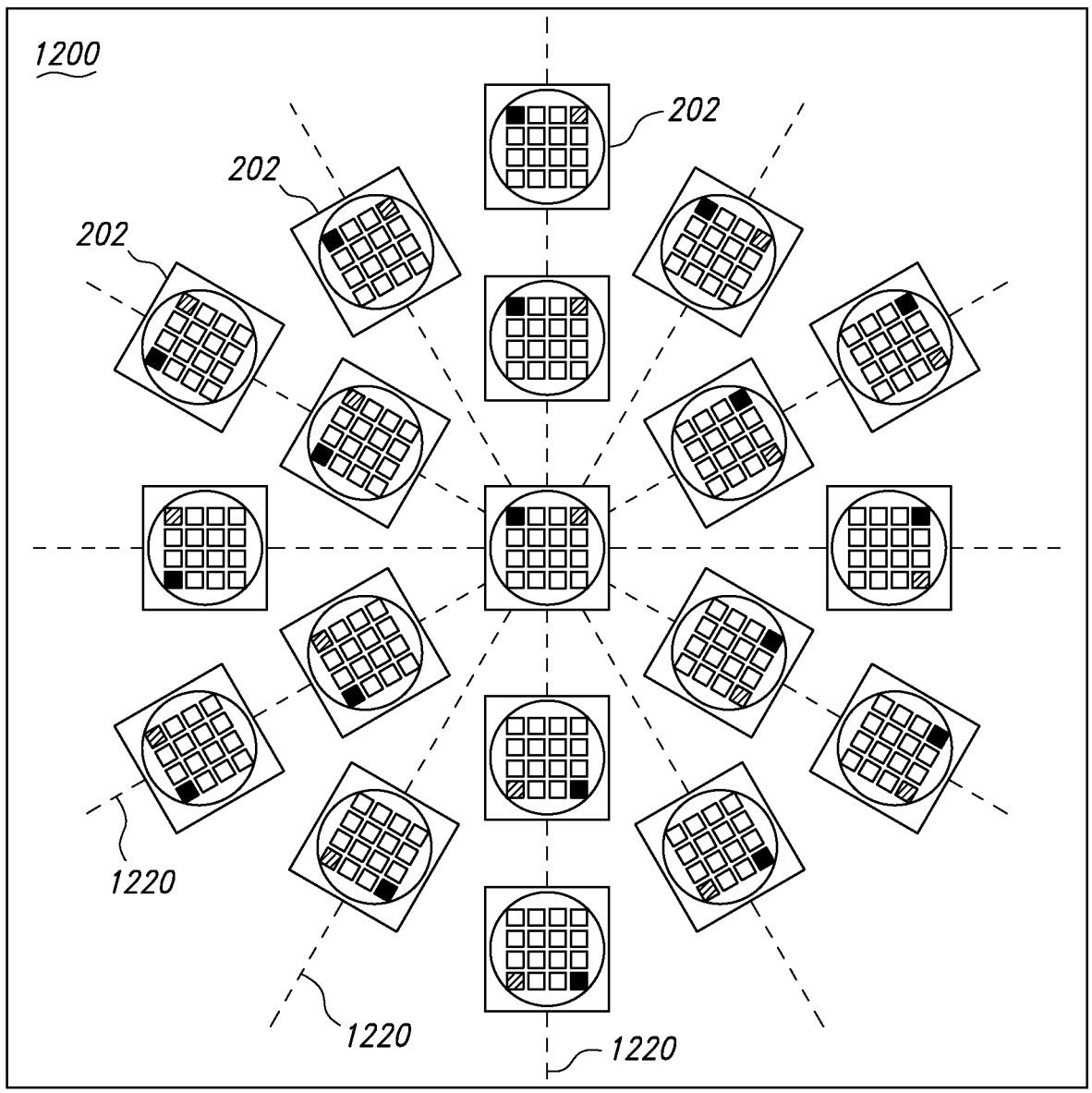
FIG. 12 shows a simplified front view of an emitter plate that can be used in some embodiments of the present invention.

FIG. 12 shows a simplified front view of an emitter plate 1200 (e.g., implementing emitter plate 106 of FIG. 1) with closely packed emitters that can be used in some embodiments of the present invention. In many respects, emitter plate 1200 can be similar to emitter plate 200 described above. For instance, emitter plate 1200 can be formed as a printed circuit board on which electrical paths (not shown) are defined, and a number of LED emitters 202 (e.g., implementing LED emitters 108 of FIG. 1) can be arranged on emitter plate 1200. In this example, nineteen LED emitters 202 are arranged in a closely spaced hexagonally symmetric pattern; in other embodiments, a different number and/or arrangement of emitters may be substituted. LED emitters 202 can be as described above with reference to FIG. 2B; other emitters can be substituted.

Each LED emitter 202 on emitter plate 1200 can be of similar or identical design, so that LEDs of a given color are distributed across the surface of emitter plate 200. Different LED emitters 202 can be rotated at different angles in the plane transverse to the optical axis. In the example shown, LED emitters 202 are rotated at angles corresponding to dotted guide lines 1220 such that each LED emitter 202 in a hexagonal group is rotated by 60 degrees relative to the next LED in the same hexagonal group. (In the drawing, two corner LEDs in each LED emitter 202 have been shaded to further show the rotational angles.) Other rotational angles may be chosen depending on the arrangement of LED emitters 202 on emitter plate 1200. Similarly to embodiments described above, rotation of the LED emitters can facilitate color mixing by a lens array. Electrical connectivity and operation of emitter plate 1200 can be as described above for emitter plate 200 of FIG. 2A.

Figure 13A:
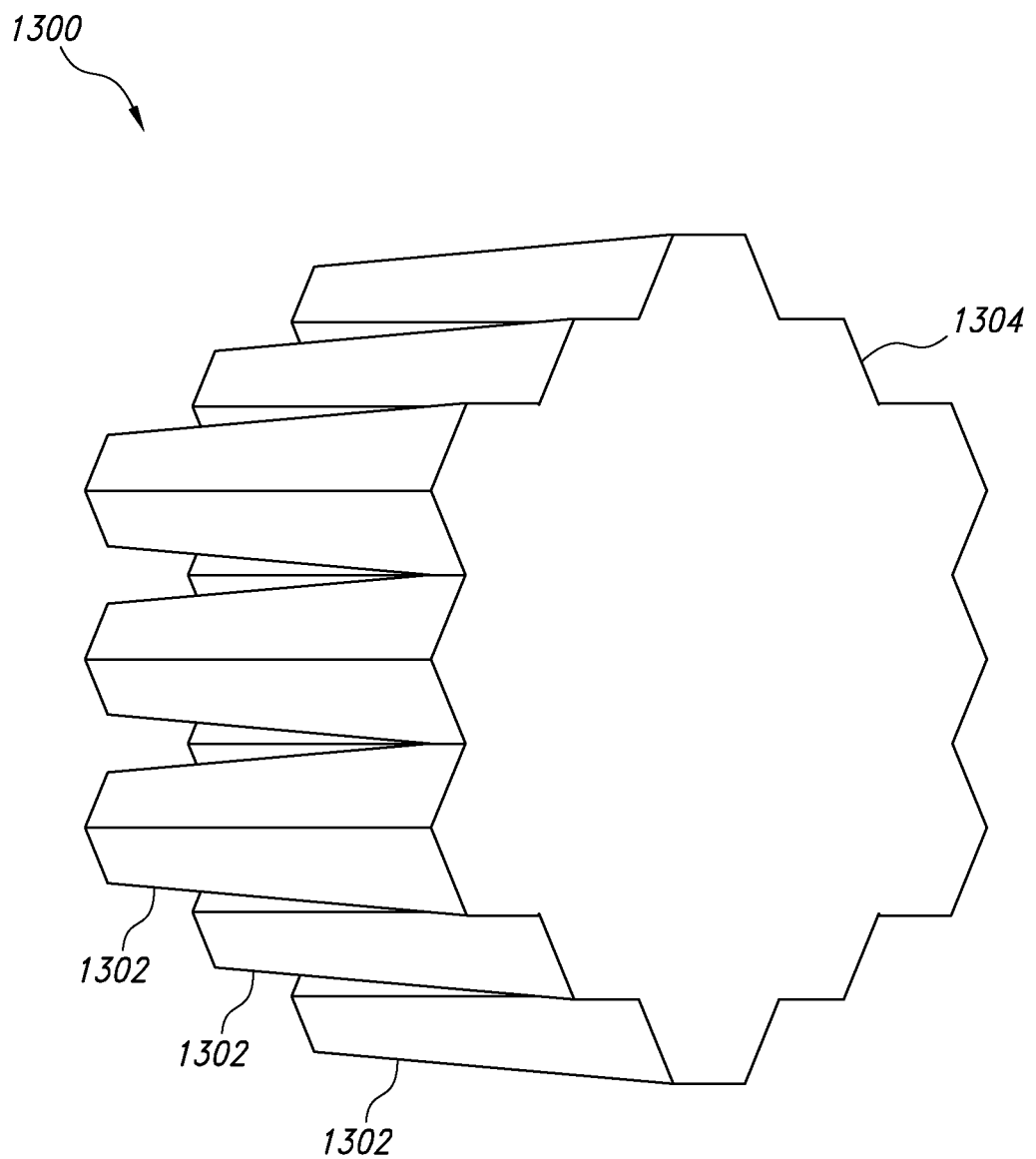
FIGS. 13A-13D show different views of a lens array according to an embodiment of the present invention.
Figure 13B:
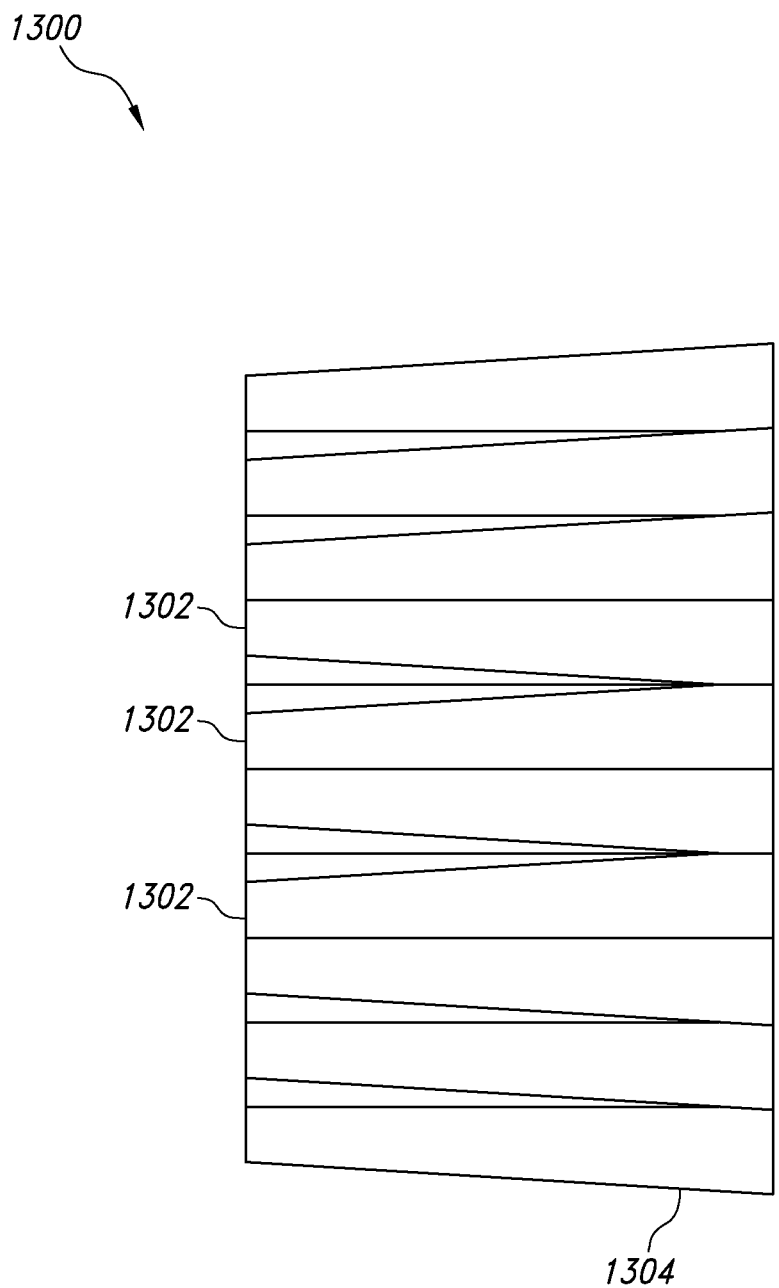
Figure 13C:
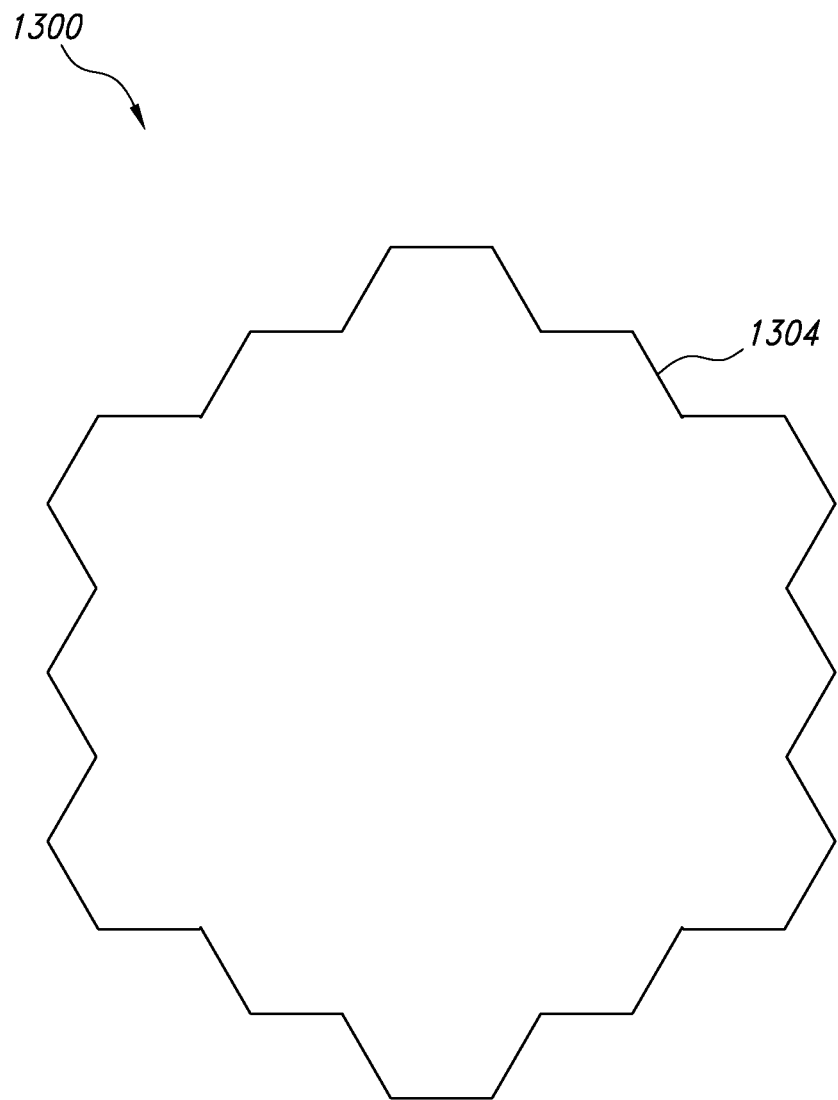
Figure 13D:
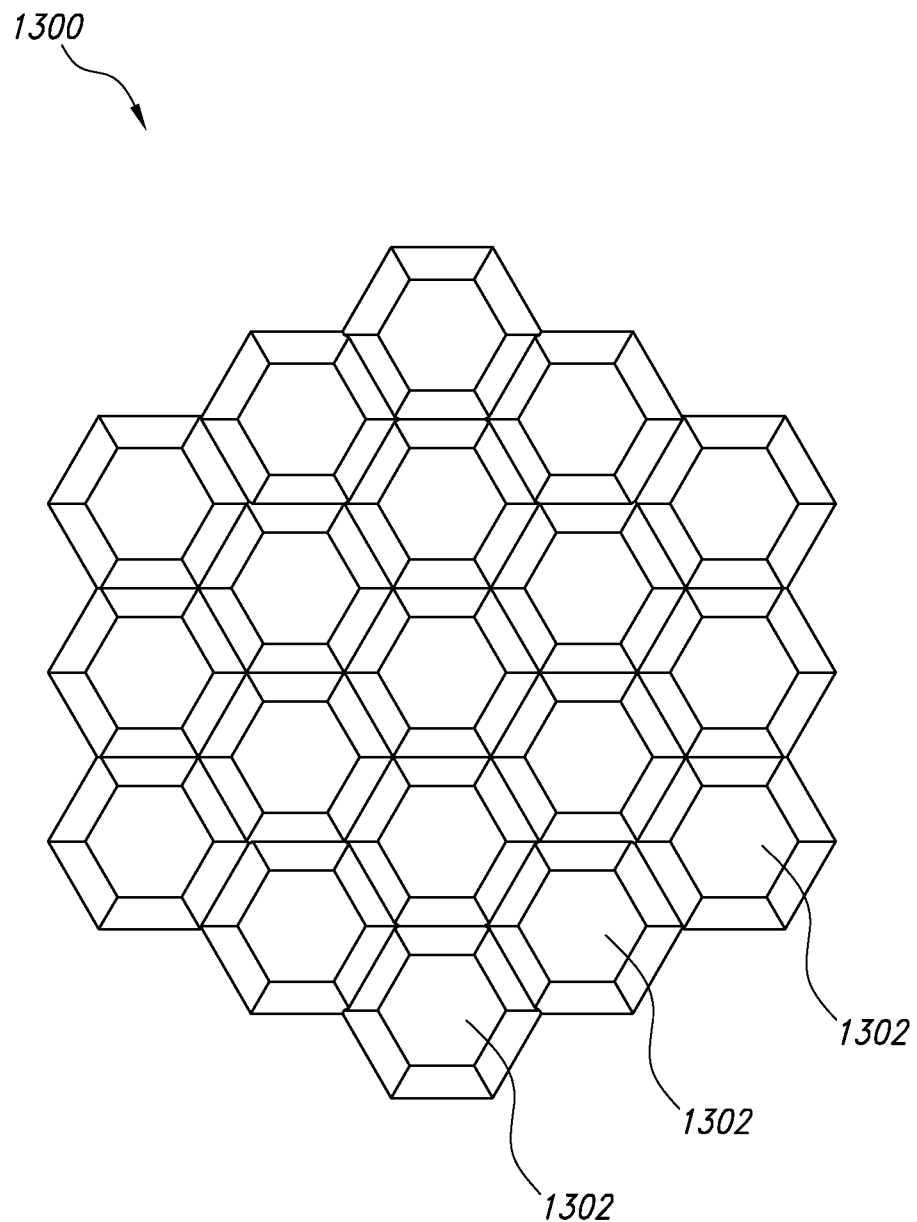

In accordance with some embodiments of the present invention, a uniform light beam of a desired color can be formed from light emitted from emitter plate 1200 by using a lens array consisting of fused color-mixing rods. FIGS. 13A-13D show different views of a lens array 1300 that can be used as lens array 110 for a lighting device with closely-packed emitters according to an embodiment of the present invention. FIG. 13A shows a front perspective view, FIG. 13B a side view, FIG. 13C a front view, and FIG. 13D a rear view. Lens array 1300 can be made of an optically transparent material such as poly (methyl methacrylate) (PMMA) or other optically transparent plastic or glass. As shown, lens array 1300 includes a set of color-mixing rod members 1302 extending parallel to each other along an axis and merging into each other to form a unitary front section 1304. Color-mixing rod members 1302 are arranged to align with a specific arrangement of LED emitters (e.g., LED emitters 202 arranged on emitter plate 1200 of FIG. 12). In this example, color-mixing rod members 1302 have hexagonal cross sections. In the example shown, the cross-sections of all color-mixing rod members 1302 have the same orientation in the plane transverse to the optical axis; however, in other embodiments, each color-mixing rod member 1302 can be oriented so that its cross section corresponds to the rotation angle of the corresponding one of LED emitters 202 shown in FIG. 12A. Front section 1304 in this example has a flat front surface. Nonplanar front surface features can be provided if desired; however, such features may result in increased etendue.

Figure 14A:
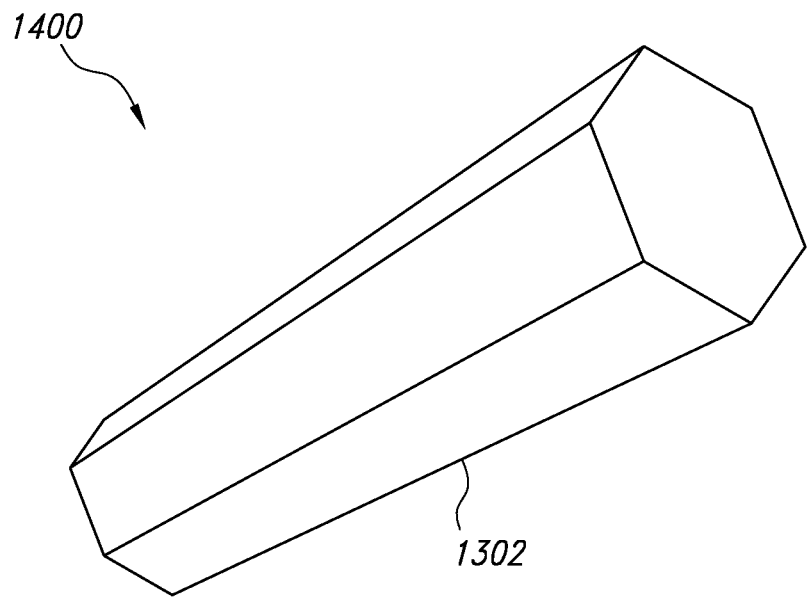
FIGS. 14A and 14B show views of a single lens element from lens array the lens array of FIGS. 13A-13D according to an embodiment of the present invention.
Figure 14B:
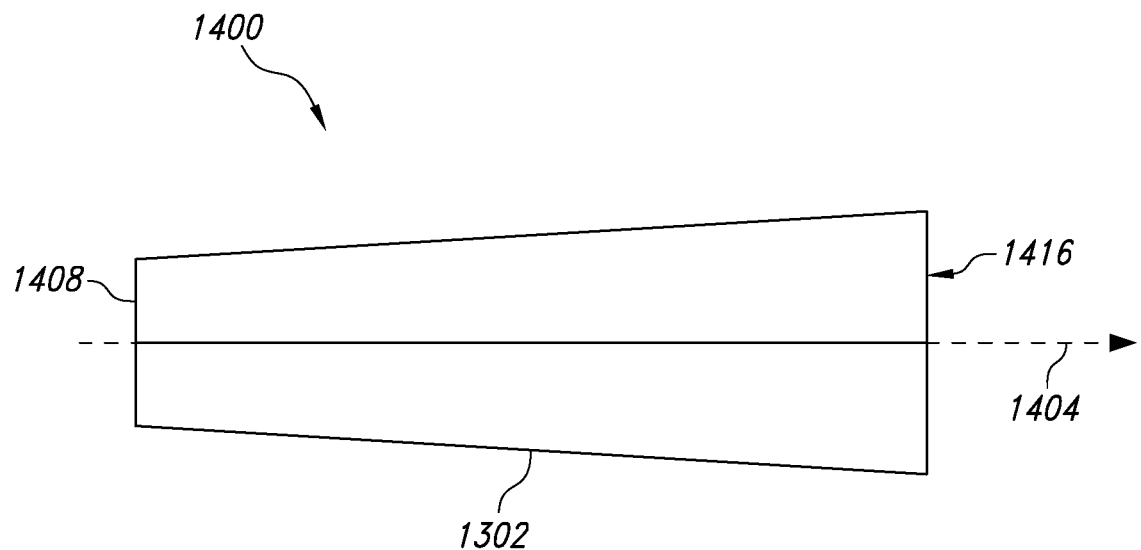

Lens array 1300 can be formed as a unitary structure, e.g., by a molding process. Thus, lens array 1300 can be made as a single, integrally-formed object. Unitary construction can avoid light loss that may occur at surface interfaces and can facilitate alignment of optical elements. For purpose of description, however, lens array 1300 can be understood as a compound optical structure composed of nearly identical lens elements arranged in parallel. FIGS. 14A and 14B show views of a single lens element 1400 from lens array 1300 according to an embodiment of the present invention. FIG. 14A shows a perspective view, and FIG. 14B shows a side view.

As shown in FIGS. 14A and 14B, lens element 1400 includes one color-mixing rod member 1302 arranged along an optical axis 1404 (shown in FIG. 14B). Color-mixing rod member 1302 can have a hexagonal cross-section in the plane transverse to optical axis 1406. While a hexagonal cross-section facilitates close packing of color-mixing rod members 1302 and merging at the front ends, other cross-sections can be used if desired. Color-mixing rod member 1302 can have tapered sides, so that the cross section at rear end 1408 is smaller than at front end 1410. Optimal dimensions for directing light from a given LED emitter can be determined by optical modeling. By way of example, for a particular LED emitter with twelve LED chips, rear end 1408 of color-mixing rod member 1302 has radius of 3.8 mm (measured as the radius of a circumscribed circle on rear front hexagonal surface), the front end of color-mixing rod member 1302 has a radius of 5.5 mm (measured as the radius of a circumscribed circle on the front hexagonal surface), and color-mixing rod member 1302 has a length of 46 mm. Color-mixing rod member 1302 can provide total internal reflection of light emitted from an LED emitter (e.g., LED emitter 202 of FIG. 2B) placed at rear end 1408, with a transmission efficiency that depends in part on the emission profile of LED emitter 202 and in part on the geometry of color-mixing rod member 1302. For a flat-top LED emitter 202, most emitted light would be at a small angle to optical axis 1406, so the transmission efficiency can be fairly high. Thus, light originating from different LED chips 214 within LED emitter 202 can be mixed during propagation through color-mixing rod member 1302 toward front end 1410.

Referring again to FIGS. 13A-13D, lens array 1300 can be understood as constructed from a number of lens elements 1400, arranged such that the rear end 1408 of each lens element 1400 can be positioned in front of a different one of the LED emitters 202 on LED emitter plate 1200. For the emitter arrangement shown in FIG. 12, lens array 1300 has a honeycomb pattern. As can be seen in FIGS. 13A-13D, the spacing between lens elements 1400 can be such that the front ends of color-mixing rod members 1302 overlap with (or merge into) each other. By way of example, for a lens array 1300 optimized for a particular LED emitter with twelve LED chips, the front face can have a dimension of 100 mm at its widest point. Overlap at the front ends of color-mixing rod members 1302 can allow light originating from different LED emitters to intermix, resulting in greater uniformity of the output light at the front face of lens array 1300. Further, the overlap can facilitate fabrication of lens array 1300 as a unitary structure, which simplifies alignment during assembly of a lighting device such as lighting device 100 and avoids light loss at internal surface interfaces.

Figure 15:
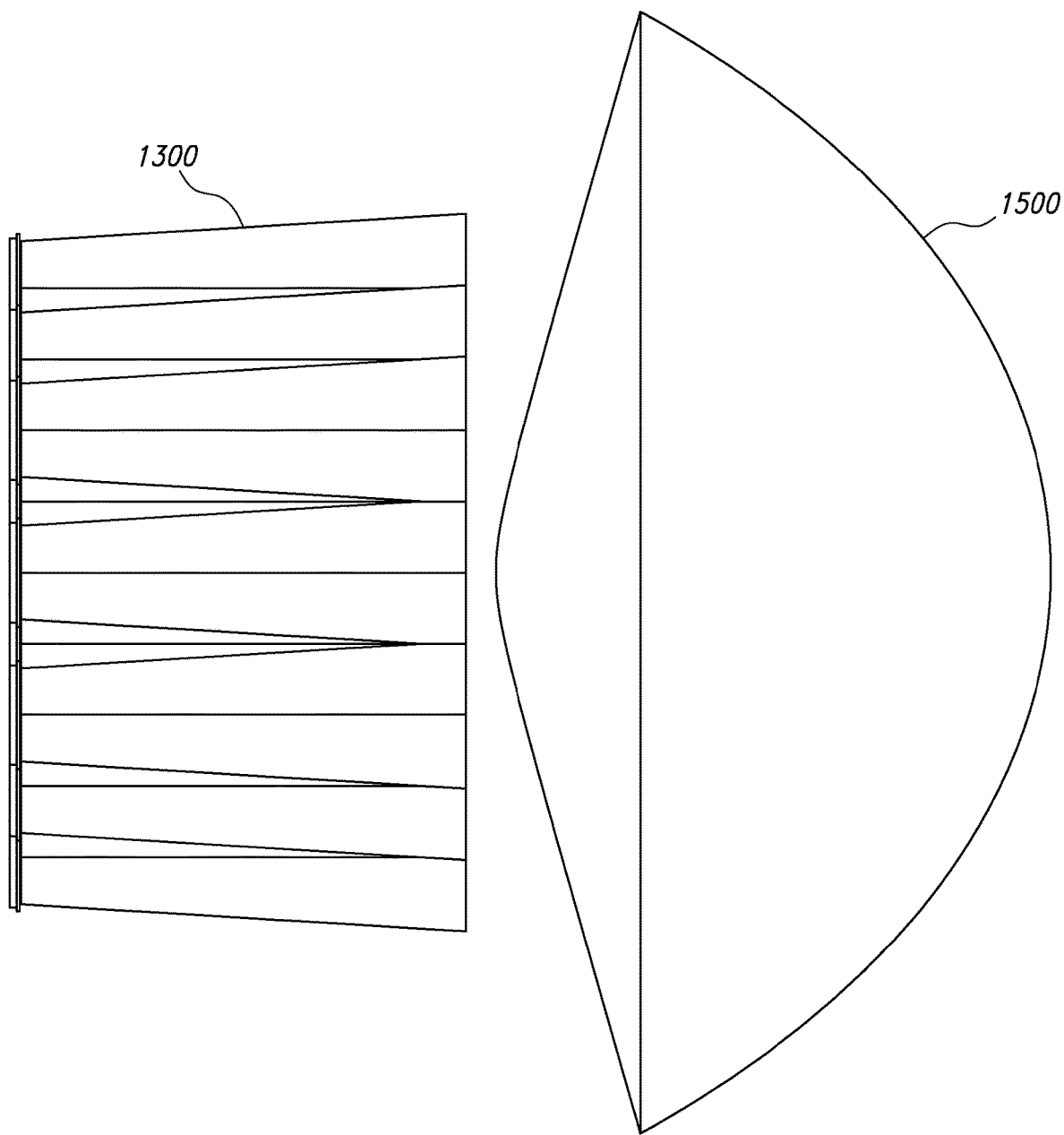
FIG. 15 shows an optical system according to an embodiment of the present invention.

Light emitted from the front surface of lens array 1300 can be relatively uniform across the front surface and at least somewhat collimated. In some embodiments, further beam shaping can be provided using by including additional optical elements in an optical system of a lighting device. By way of illustration, FIG. 15 shows a condenser lens 1500 (e.g., implementing condenser lens group 114 of FIG. 1) placed in front of lens array 1300 to form an optical system according to an embodiment of the present invention. Condenser lens 1500 can be an aspheric biconvex lens designed to further collimate the emitted light. In this example, a single condenser lens 1500, rather than a pair of lenses, is used. In one example embodiment, condenser lens 1500 has a maximum thickness of 39 mm (on its optical axis), a diameter of 110 mm, and a back focal length of 31 mm. Those skilled in the art will appreciate that the particular geometry of a condenser lens can depend on the specific application for which a particular lighting device is designed.

It will be appreciated that the lens arrays described herein are illustrative and that variations and modifications are possible. For example, a lens array may include a number of color-mixing rod members (and corresponding beam-forming elements) corresponding to the number of LED emitters on a given emitter plate. The hexagonal geometry shown herein allows close packing between adjacent beam-forming elements (or between adjacent color-mixing rods), which can make it easier to produce a uniform light beam, but other geometries are not precluded. Lens arrays described herein each include a color-mixing rod member for each emitter to mix the light from individual LED chips within the emitter (which may have different colors). Each color-mixing rod can be aligned with a beam-forming element to improve the uniformity of intensity of the overall output beam. In some embodiments, the beam forming elements may also provide additional color mixing. In some embodiments, beam forming elements with nonplanar surface features can be omitted, and tapered color-mixing rod members can merge into each other at their front ends to provide a unitary structure.

In some embodiments, a lens array can incorporate additional elements to facilitate color mixing, such as microscopic or nanoscale particles dispersed in the optically transparent material, and/or microlens structures formed on outer surfaces, such as part or all of the front surfaces of the lens array or individual beam-forming elements.

The rear surfaces of the color-mixing rod members can be adapted to contact front surfaces of corresponding LED emitters. In some embodiments, the LED emitters have a flat front surface, and the rear surfaces of the color mixing rods can be flat as well. Optical grease or the like may be applied to reduce light loss at the interface. In some embodiments, alignment structures (e.g., one or more recesses or projections) can be formed in the rear surfaces of the color-mixing rod members to facilitate alignment with the LED emitters.

Side surfaces of the color-mixing rod members may also be modified. In various examples described herein, the color-mixing rod members have cross-sections that are square, octagonal, or hexagonal; in other embodiments the color-mixing rod members may have other shapes (e.g., round or rectangular shapes), and the length of the color-mixing rod members can be chosen as desired. As in the examples above, the side surfaces of the color-mixing rod members can be tapered, and such tapering can but need not be linear. In some embodiments, the shape is chosen to optimize a tradeoff between color mixing and light loss. As noted above, the LED emitters on an emitter plate can be rotated at different angles, and each color-mixing rod member may be oriented so that its cross section corresponds to the rotation angle of its corresponding LED emitter. Use of different rotational angles for the LED emitters can result in more effective color mixing in the beam-forming section and a more uniform color of the output light from the lens array, regardless of whether the color-mixing rod members are oriented to align their cross-sections with the rotational angles of their corresponding LED emitters.

The beam-forming section of a lens array can include a nonplanar front surface feature (and in some embodiments a nonplanar rear surface feature) aligned with each color-mixing rod member. The nonplanar surface features can be shaped according to specific design goals, including color uniformity and/or efficiency of light transmission. As noted above, the optimal design may involve tradeoffs among different goals, and depending on the particular application, the beam-forming section may include convex, concave, or planar surface features at the front and/or rear surfaces. For instance, lens element 400 of FIGS. 4A-4C and lens element 700 of FIGS. 7A-7C each have convex rear surface features and concave front surface features; lens element 1000 of FIGS. 10A-10B has a planar rear surface and convex front surface features. In some embodiments, nonplanar front (and rear) surface features can be omitted, e.g., as in lens array 1300 of FIGS. 13A-13D.

Lens arrays and optical systems as described herein can be used in a variety of multi-emitter LED-based lighting devices, including devices as described above where each emitter includes LED chips of different colors (where the "color" of an LED chip refers to the color of emitted light, including any wavelength-altering material that may be applied to the chip). The color of the emitted light may be controllable, e.g., by controlling the current delivered to different LED chips. Such devices have a number of applications, including but not limited to stage lighting as used in theaters, concert venues, and the like. More generally, lens arrays and optical systems as described herein can be used in any lighting device where it is desirable to combine the light from multiple LED emitters into a single uniform beam. The lens arrays and optical systems described herein can produce a beam of light with an approximately round cross section. However, the invention is not limited to any particular beam geometry, and a different arrangement of LED emitters (and corresponding arrangement of lens elements of the lens array) may produce a different beam geometry.

While the invention has been described with respect to specific embodiments, those skilled in the art will recognize that numerous modifications are possible. For instance, the number and arrangement of LED emitters may be modified, as may the number and arrangement of LED chips within a emitter. The overall geometry of the lens array (e.g., number and arrangement of lens elements) can be adapted to match a particular arrangement of LED emitters, and the geometry of elements within a lens array may be modified according to the number and arrangement of LED chips within the emitter. All dimensions given herein are for purposes of illustration and can be varied as desired.

Thus, although the invention has been described with respect to specific embodiments, it will be appreciated that the invention is intended to cover all modifications and equivalents within the scope of the following claims.

What is claimed is:

1. A lens array for a multi-emitter LED-based lighting device having a plurality of LED emitters arranged on an emitter plate, the lens array comprising:
   a plurality of color-mixing rod members, each having a front end and a rear end, the color-mixing rod members extending parallel to each other along an optical axis and being arranged such that a rear end of each color-mixing-rod member aligns with a corresponding one of the plurality of LED emitters; and a beam-forming section formed at the front ends of the plurality of color mixing rod members, the beam-forming section including a front surface having a plurality of nonplanar front surface features, each nonplanar front surface feature being aligned with the front end of a corresponding one of the color-mixing rod members, wherein the color-mixing rod members and the beam-forming section are formed as a unitary structure made of a single continuous piece of optically transparent material and wherein light exiting from the front surface of the beam-forming section is collimated and of uniform intensity.

2. The lens array of claim 1 wherein:
the color-mixing rod members and the beam-forming section are formed as a unitary structure;
the color-mixing rod members and the nonplanar front surface features are arranged in a hexagonal pattern;
the nonplanar front surface features include concave surface features;
a rear surface of the beam-forming section has a plurality of convex rear surface features, each convex rear surface feature being aligned with a corresponding one of the concave surface features of the front surface;
each of the color-mixing rod members has a square cross section in a plane transverse to the optical axis; and
different ones of the color-mixing rod members are oriented at different rotational angles in the plane transverse to the optical axis.

3. The lens array of claim 1 wherein the nonplanar front surface features include concave surface features.

4. The lens array of claim 3 wherein a rear surface of the beam-forming section has a plurality of convex rear surface features, each convex rear surface feature being aligned with a corresponding one of the concave surface features of the front surface.

5. The lens array of claim 1 wherein the nonplanar front surface features include convex surface features.

6. The lens array of claim 1 wherein the color-mixing rod members and the nonplanar front surface features are arranged in a hexagonal pattern.

7. The lens array of claim 1 wherein each of the color-mixing rod members has a square cross section in a plane transverse to the optical axis.

8. The lens array of claim 7 wherein different ones of the color-mixing rod members are oriented at different rotational angles in the plane transverse to the optical axis.

9. An optical system for a multi-emitter LED-based lighting device having a plurality of LED emitters arranged on an emitter plate, the optical system comprising:
a lens array having:
a plurality of color-mixing rod members, each having a front end and a rear end, the color-mixing rod members extending parallel to each other along an optical axis and being arranged such that a rear end of each color-mixing-rod member aligns with a corresponding one of the plurality of LED emitters; and
a beam-forming section formed at the front ends of the plurality of color mixing rod members, the beam-forming section including a front surface having a plurality of nonplanar front surface features, each nonplanar front surface feature being aligned with the front end of a corresponding one of the color-mixing rod members,
wherein the color-mixing rod members and the beam-forming section are formed as a unitary structure made of a single continuous piece of optically transparent material and wherein light exiting from the front surface of the beam-forming section is collimated and of uniform intensity; and
a condenser lens positioned in front of the lens array.

10. The optical system of claim 9 wherein the color-mixing rod members and the nonplanar front surface features are arranged in a hexagonal pattern.

11. A lighting device comprising:
an emitter plate;
a plurality of LED emitters arranged on the emitter plate, wherein each emitter includes a plurality of LED chips; and
a lens array having:
a plurality of color-mixing rod members, each having a front end and a rear end, the color-mixing rod members extending parallel to each other along an optical axis and being arranged such that a rear end of each color-mixing-rod member aligns with a corresponding one of the plurality of LED emitters; and
a beam-forming section formed at the front ends of the plurality of color mixing rod members, the beam-forming section including a front surface having a plurality of nonplanar front surface features, each nonplanar front surface feature being aligned with the front end of a corresponding one of the color-mixing rod members,
wherein the color-mixing rod members and the beam-forming section are formed as a unitary structure made of a single continuous piece of optically transparent material and wherein light exiting from the front surface of the beam-forming section is collimated and of uniform intensity.

12. The lighting device of claim 11 further comprising:
a condenser lens positioned in front of the lens array.

13. The lighting device of claim 11 wherein the nonplanar front surface features include concave surface features.

14. The lighting device of claim 13 wherein a rear surface of the beam-forming section has a plurality of convex rear surface features, each convex rear surface feature being aligned with a corresponding one of the concave surface features of the front surface.

15. The lighting device of claim 11 wherein the nonplanar front surface features include convex surface features.

16. The lighting device of claim 11 wherein the color-mixing rod members and the nonplanar front surface features are arranged in a hexagonal pattern.

17. The lighting device of claim 11 wherein each of the color-mixing rod members has a square cross section in a plane transverse to the optical axis.

18. The lighting device of claim 17 wherein the LED emitters are arranged at different rotational angles in a plane defined by the emitter plate and wherein each of the color-mixing rod members is oriented at a rotational angle matching the rotational angle of the corresponding one of the LED emitters.

19. The lighting device of claim 11 wherein each of the LED emitters includes LED chips of at least two different colors.

20. A lighting device comprising:
a planar emitter plate;

a plurality of LED emitters arranged on the emitter plate, wherein each emitter includes a plurality of LED chips, wherein each of the LED emitters includes LED chips of at least two different colors, wherein the LED emitters are arranged in a hexagonal pattern, and wherein different LED emitters are oriented at different rotational angles in a plane defined by the emitter plate; and a lens array having:

a plurality of color-mixing rod members, each having a front end and a rear end, the color-mixing rod members extending parallel to each other along an optical axis and being arranged such that a rear end of each color-mixing-rod member aligns with a corresponding one of the plurality of LED emitters, wherein each of the color-mixing rod members has a square cross section in a plane transverse to the optical axis and each of the color-mixing rod members is oriented at a rotational angle matching the rotational angle of the corresponding one of the LED emitters; and a beam-forming section formed at the front ends of the plurality of color mixing rod members, the beam-forming section including a plurality of concave front surface features, each concave front surface feature being aligned with the front end of a corresponding one of the color-mixing rod members, the beam-forming section further including a front surface having a plurality of convex rear surface features, each convex rear surface feature being aligned with a corresponding one of the concave surface features of the front surface, wherein the color-mixing rod members and the beam-forming section are formed as a unitary structure made of a single continuous piece of optically transparent material and wherein light exiting from the front surface of the beam-forming section is collimated and of uniform intensity; and a condenser lens placed in front of the lens array.

* * * * *